United States Patent
Thirumalasetty et al.

(10) Patent No.: US 11,639,670 B2
(45) Date of Patent: May 2, 2023

(54) CORE RUB DIAGNOSTICS IN ENGINE FLEET

(71) Applicant: General Electric Company, Schenectady, NY (US)

(72) Inventors: Praveen Thirumalasetty, Bangalore (IN); Peeyush Pankaj, Bangalore (IN); Rajesh Kumar Undipalli, Bangalore (IN); Manoj Nayani, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 658 days.

(21) Appl. No.: 16/684,150

(22) Filed: Nov. 14, 2019

(65) Prior Publication Data
US 2021/0148246 A1 May 20, 2021

(51) Int. Cl.
*F01D 21/00* (2006.01)
*F02C 9/00* (2006.01)
*G05B 23/02* (2006.01)
*F01D 17/08* (2006.01)

(52) U.S. Cl.
CPC .............. *F01D 21/003* (2013.01); *F02C 9/00* (2013.01); *F01D 17/085* (2013.01); *F05D 2220/323* (2013.01); *F05D 2260/80* (2013.01); *F05D 2270/303* (2013.01); *F05D 2270/44* (2013.01); *G05B 23/0283* (2013.01)

(58) Field of Classification Search
None
See application file for complete search history.

(56) References Cited

U.S. PATENT DOCUMENTS

| H1006 H | * | 12/1991 | Zwicke ........................ 73/660 |
| 7,027,953 B2 | | 4/2006 | Klein |
| 7,062,370 B2 | | 6/2006 | Vhora et al. |
| 7,409,319 B2 | | 8/2008 | Kant et al. |
| 7,677,090 B2 | | 3/2010 | Moen |

(Continued)

OTHER PUBLICATIONS

Oh et al., "Scalable and Unsupervised Feature Engineering Using Vibration-Imaging and Deep Learning for Rotor System Diagnosis", IEEE Transactions on Industrial Electronics, vol. 65, No. 4, Apr. 2018, pp. 3539-3549 (Year: 2018).*

*Primary Examiner* — Brent A. Fairbanks
(74) *Attorney, Agent, or Firm* — Venable LLP; Elizabeth C. G. Gitlin; Michele V. Frank

(57) ABSTRACT

Systems and techniques that facilitate predictive core rub diagnostics are provided. A sensor component can collect real-time operation parameters of a gas turbine engine. An analysis component can statistically combine first values, second values, and third values to yield a rub indicator for the engine. The first values can be based on a first comparison of fundamental mode placements of the engine, derived from the real-time operation parameters, and baseline fundamental mode placements. The second values can be based on a second comparison of a vibration spectrum of the engine, derived from the real-time operation parameters, and a baseline vibration spectrum. The third values can be based on a third comparison of the real-time operation parameters of the engine and baseline operation parameters. A classification component can generate a rub classification report indicating presence of rubbing in the engine, based on the rub indicator.

20 Claims, 24 Drawing Sheets
(8 of 24 Drawing Sheet(s) Filed in Color)

(56) References Cited

U.S. PATENT DOCUMENTS

| | | | |
|---|---|---|---|
| 8,075,489 B2 | 12/2011 | Fukuda et al. | |
| 9,624,936 B2 | 4/2017 | Johnsen | |
| 9,874,472 B2 | 1/2018 | Tarassenko et al. | |
| 9,903,787 B2 | 2/2018 | Cerny et al. | |
| 9,989,439 B2 | 6/2018 | Thomson | |
| 10,317,275 B2 | 6/2019 | Liu | |
| 2004/0148129 A1* | 7/2004 | Gotoh | G05B 23/0229 702/183 |
| 2004/0176902 A1 | 9/2004 | McBrien et al. | |
| 2013/0068003 A1 | 3/2013 | Kumar et al. | |
| 2014/0369833 A1* | 12/2014 | Yu | F01D 21/04 416/61 |
| 2015/0185128 A1 | 7/2015 | Chang et al. | |
| 2016/0260263 A1 | 9/2016 | Kando et al. | |
| 2018/0266269 A1* | 9/2018 | Blakeman | F01D 21/003 |
| 2019/0102494 A1* | 4/2019 | Mars | G06F 30/20 |

\* cited by examiner

SHORT LISTING, BY THE DEVICE, THE GAS TURBINE ENGINE FOR A POTENTIAL BORESCOPE INSPECTION, BASED ON THE RUB CLASSIFICATION REPORT — 1402

CORE RUB DIAGNOSTICS IN ENGINE FLEET

BACKGROUND

The subject disclosure relates generally to engine diagnostics, and more particularly to systems and computer-implemented methods that can facilitate predictive core rub diagnostics in an engine fleet.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate predictive core rub diagnostics of an engine fleet are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a sensor component, which can collect, from one or more sensors, real-time operation parameters of a gas turbine engine. In various embodiments, the computer-executable components can further comprise an analysis component, which can statistically combine one or more first values, one or more second values, and one or more third values to yield a rub indicator for the gas turbine engine. In various aspects, the one or more first values can be based on a first comparison of fundamental mode placements of the gas turbine engine and baseline fundamental mode placements, where the fundamental mode placements of the gas turbine engine can be derived from the real-time operation parameters. In various instances, the one or more second values can be based on a second comparison of a vibration spectrum of the gas turbine engine and a baseline vibration spectrum, where the vibration spectrum of the gas turbine engine can be derived from the real-time operation parameters. In various aspects, the one or more third values can be based on a third comparison of the real-time operation parameters of the gas turbine engine and baseline operation parameters. In one or more embodiments, the computer-executable components can further comprise a classification component that can generate a rub classification report indicating presence of rubbing between a rotor and a stator or between a rotor and another rotor of the gas turbine engine, based on the rub indicator. In various embodiments, the analysis component can generate the one or more first values via a first machine learning algorithm trained to recognize patterns in the first comparison indicative of no rubbing, light rubbing, heavy rubbing, or blade loss. In various instances, the analysis component can generate the one or more second values via a second machine learning algorithm trained to recognize patterns in the second comparison indicative of no rubbing, light rubbing, heavy rubbing, or blade loss. In various aspects, the analysis component can generate the one or more third values via a third machine learning algorithm trained to recognize patterns in the third comparison indicative of no rubbing, light rubbing, heavy rubbing, or blade loss. In one or more embodiments, the computer-executable components can further comprise an on-ground digital twin component that can monitor performance of the gas turbine engine based on the rub classification report and can recommend corrective action to the gas turbine engine based on the rub classification report. In one or more embodiments, the on-ground digital twin component can track emerging trends in a fleet of gas turbine engines by monitoring other rub classification reports associated with the fleet and can perform proactive work-scope identification for the fleet of gas turbine engines prior to scheduled maintenance, repair, and overhaul visits.

According to one or more embodiments, the above-described system can be implemented as a computer-implemented method.

According to one or more embodiments, the above-described system can be implemented as a computer program product for facilitating predictive core rub diagnostics, the computer program product comprising a computer readable memory having program instructions embodied therewith, the program instructions executable by a processing component to cause the processing component to perform various acts.

Because different types of engine rubs (e.g., axial rubbing, radial rubbing, combination rubbing, and so on) can vary in severity and manifest themselves in different ways (e.g., impulsive, high-amplitude vibration; continuous, low-amplitude vibration; partial vibration; full annular vibration; abnormal temperature measurements; abnormal pressure measurements; abnormal stress/strain measurements; abnormal electrical measurements; abnormal mass flow rate measurements; abnormal rotational speed measurements; and so on), a single-pronged vibration analysis (e.g., only operation parameter analysis, only spectra analysis, and so on) can detect and/or predict only a subset of types of engine rubs. Even if a rub is detected, such single-pronged analyses cannot adequately categorize the type of rubbing detected (e.g., light axial rubbing, heavy radial rubbing, blade loss, and so on). To address these problems, various embodiments of the subject claimed innovation can perform a three-pronged vibration analysis (e.g., mode placement analysis, vibration spectrum analysis, operation parameter analysis, and so on) based on machine learning pattern recognition to provide reliable, fault-tolerant detection and/or prediction of various types of engine rubbing. In various aspects, such a three-pronged approach can improve rub detection efficacy and reduce a number of false-positive and/or false-negative rub detections. In various aspects, such a three-pronged approach can leverage machine learning pattern recognition to accurately categorize detected rubs (e.g., detecting a rub and identifying the type and/or severity of the detected rub). In one or more embodiments, the subject claimed innovation can generate a rub indicator as a function of the three-pronged vibration analysis, which can be used to track and detect engine rubs in real-time, as well as to predict engine rubs before they occur (e.g., by analyzing magnitude, slope, and/or variability of the rub indicator over time). In various instances, the rub indicator can be a continuously-variable scalar rather than a binary rub or no-rub alert. In one or more embodiments, an on-ground digital twin can monitor the rub indicator of the analyzed engine and can make recommendations regarding corrective and/or preventative actions for the analyzed engine based on the detected and/or predicted rubs. In one or more embodiments, the on-ground digital twin can also monitor a fleet of engines, track emerging rub-indicator trends in the fleet, and make recommendations to one or more engines in the fleet based on the emerging rub-indicator trends. In various embodiments, the subject claimed innovation can be implemented in an aircraft's full authority digital engine control (FADEC) logic, so that the FADEC logic's intended/planned actions can be compared against detected and/or predicted rubs to determine whether the intended/planned actions are appropriate.

DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
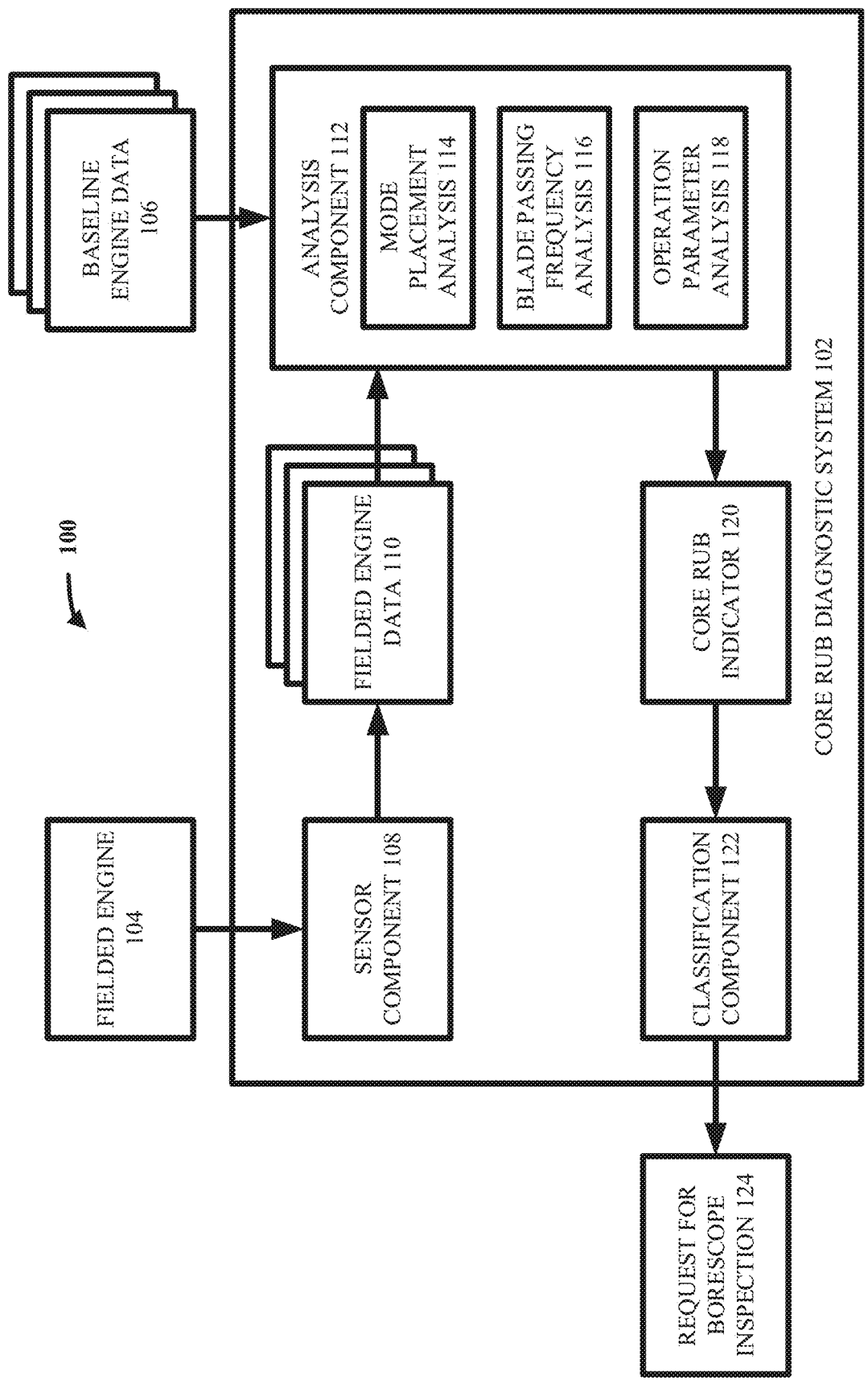
FIG. 1 illustrates a high-level block diagram of an example, non-limiting system that facilitates predictive core rub diagnostics in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Modern gas turbine engines, such as the Passport 20 (P20) and the Leading Edge Aviation Propulsion (LEAP), have very tight clearances (e.g., shaft clearances, tip clearances, and so on) to provide for better turbine efficiency. However, such tight clearances can increase the risk of rotor-to-stator and/or rotor-to-rotor rubs. Such engine rubbing can negatively affect performance retention of engine core modules. Thus, systems and/or methods for detecting, predicting, and/or preventing engine rubs are advantageous.

A gas turbine engine can experience different types, categories, and/or severities of rubs. For instance, a rub's severity can vary from light (e.g., low angle of incidence to contact zone, mere tangential contact, and so on) to heavy (e.g., steep angle of incidence to contact zone, blade collision, and so on). In severe cases, rubbing can cause blade loss in the engine (e.g., total loss and/or partial loss of a rotor blade and/or stator blade). A rub can be categorized as axial (e.g., rubbing of the rotor's annular shaft with other components on the engine's central shaft, and so on), radial (e.g., rubbing of the rotor's blade tips with the sidewall of the engine's casing and/or with stator blades protruding radially inward from the sidewall of the engine's casing, and so on), or a combination of the two. In various cases, rubs can be partial (e.g., rub contact persists for less than all of the rotation cycle) or full annular (e.g., rub contact persists for all or substantially all of the rotation cycle). Such different types and/or severities of engine rubs can manifest themselves in different ways. For instance, some rubs can manifest as high-amplitude, low-frequency, impulsive vibrations characterized by non-constant, periodic contact/collision of a rotor with another component, while others can manifest as low-amplitude, high-frequency vibrations characterized by constant, continuous contact between a rotor and another component, and so on. Depending on the particular type of rub, symptoms can manifest in the form of abnormal engine sensor measurements with respect to temperature, pressure, voltage, current, air/fuel mass flow rate, air speed, rotor speed, stress/strain, and so on. In other words, different types/severities of rubs can exhibit different vibration signatures and/or operation parameter signatures (e.g., continuous engine operation data). Systems for rub detection in gas turbine engines that utilize only one mode of analysis (e.g., detecting rubs by monitoring only certain engine operation parameters, detecting rubs by monitoring only engine vibration spectra, and so on) can detect only a subset of possible engine rubs that can occur. For instance, a system that monitors only temperature and pressure measurements cannot reliably detect and/or predict a type of rub that manifests itself primarily by abnormalities in other operation parameters. Moreover, even if such a single-pronged approach detects an engine rub, it cannot adequately categorize and/or characterize the type of detected rub (e.g., light, heavy, blade loss, axial, radial, combination, partial, full annular, affected rotor, and so on). Furthermore, such single-pronged approaches tend to be reactive rather than proactive; they attempt to detect rubs when and/or after the rubs have occurred, and they offer inadequate capabilities for predicting rubs before they occur. Further still, such single-pronged systems provide only a binary alert (e.g., rub or no rub) to an operator of an engine; such systems do not enable FADEC logic controllers to compare their intended actions with the detected/predicted rubs to evaluate the appropriateness of their intended actions.

Various embodiments described herein include systems, computer-implemented methods, apparatus, and/or computer program products that facilitate core rub diagnostics of an engine fleet. In one or more instances, the subject claimed innovation can utilize a three-pronged analysis to facilitate detection and/or prediction of engine rubs. In various cases, the subject claimed innovation can leverage machine learning pattern recognition, trained via supervised learning, to compare current and baseline mode placements, to compare current and baseline vibration spectrum signatures, and to compare current and baseline operation parameters associated with the engine. Based on these comparisons, a rub indicator (e.g., continuous scalar value) can be generated, which can be used to detect, predict, and/or characterize engine rubs. In various embodiments, an on-ground digital twin can monitor the rub indicator and make recommendations for corrective and/or preventative actions to the engine's FADEC logic. In various embodiments, the on-ground digital twin can likewise monitor a fleet of engines (e.g., monitoring rub indicators from the fleet) in order to track emerging rub-indicator trends in the fleet. The on-ground digital twin can then make recommendations to one or more engines in the fleet based on the emerging trends. In various aspects, the FADEC logic can evaluate the appropriateness of an intended/planned course of action for the engine based on the detected/predicted rubs.

Various embodiments of the subject innovation can be employed to use hardware and/or software to solve problems that are highly technical in nature (e.g., to facilitate the automated detection, prediction, and/or categorization of gas turbine engine rubs), that are not abstract and that cannot be performed as a set of mental acts by a human. Further, some of the processes performed can be performed by a specialized computer for carrying out defined tasks related to engine core rub diagnostics (e.g., collection of real-time operation parameters of the gas turbine engine, generation of first values based on a comparison of fundamental mode placements of the engine with baseline mode placements, generation of second values based on a comparison of vibration spectra of the engine with baseline vibration spectra, generation of third values based on a comparison of real-time operation parameters of the engine with baseline operation parameters, statistical combination of the first, second, and third values to form a rub indicator for the engine, detecting/predicting rubs based on the rub indicator, comparing the rub indicator to a FADEC logic's planned actions to evaluate the efficacy of the planned actions, tracking emerging trends in rub indicators from an engine fleet, and so on). In various aspects, the subject claimed innovation can provide technical improvements to the field of engine core rub diagnostics, by utilizing a three-pronged analysis to reduce a number of false-positive and/or false-negative rub detections, to accurately categorize detected and/or predicted types of rubs, and to make recommendations to the engine based on the detected/predicted rubs. Such core rub diagnostic systems can result in improved rub diagnostic efficacy, increased engine core module durability, improved performance retention, reduced unplanned engine removals, better fleet management, and better planning for shop visits, and thus constitutes a concrete and tangible technical improvement in the prior art.

FIG. 1 illustrates a high-level block diagram of an example, non-limiting system 100 that can facilitate predictive core rub diagnostics in accordance with one or more embodiments described herein. As shown, a core rub diagnostic system 102 can leverage baseline engine data 106 in order to diagnose and/or predict rubs in the fielded engine 104. In various embodiments, the fielded engine 104 can be any suitable type of gas turbine engine (e.g., P20, LEAP, jet engines, turbofan engines, and so on). In various aspects, the baseline engine data 106 can correspond to proper performance and/or healthy operation of the fielded engine 104 and can be derived from one or more development engines (e.g., engines tested under controlled conditions, such as in a laboratory), fielded engine legacy data (e.g., data for engines of fielded commercial aircraft that are known to be performing properly or that were recently serviced), theoretical performance thresholds (e.g., theoretical operation of an engine as determined by a computational and/or analytical model of the engine), and so on. In various instances, the baseline engine data 106 can include any data that is known to correspond to healthy performance (e.g., no rubbing) of the fielded engine 104 (e.g., temperatures, pressures, voltages, currents, air mass flow rates, fuel mass flow rates, air speeds, stresses/strains, rotational speeds, vibration amplitudes, accelerations, and so on). Any other suitable baseline data that characterize some aspect of performance of an engine can be incorporated in various embodiments.

In one or more embodiments, the core rub diagnostic system 102 can, via a sensor component 108, receive measurements from one or more sensors of the fielded engine 104, thereby yielding fielded engine data 110. In various aspects, the sensors can include any of temperature sensors, pressure sensors, voltage sensors, current sensors, air mass flow rate sensors, fuel mass flow rate sensors, stress/strain sensors, rotational speed sensors, vibration amplitude sensors, accelerometers, and so on. Any other suitable sensors and/or sensor data associated with the fielded engine 104 can be incorporated in various embodiments.

In one or more embodiments, the core rub diagnostic system 102 can, via an analysis component 112, perform a three-pronged analysis to detect and/or predict rubs in the fielded engine 104, by comparing the fielded engine data 110 with the baseline engine data 106. More specifically, in one or more embodiments, the analysis component 112 can perform a mode placement analysis 114, a blade passing frequency analysis 116, and/or an operation parameter analysis 118.

In various aspects, the mode placement analysis 114 can include determining, from the fielded engine data 110, one or more fundamental modes (e.g., operational natural frequencies) of the fielded engine 104. In various instances, this can include determining one or more bowed rotor modes, one or more pitch modes, one or more high speed modes, and so on, as well as corresponding vibration levels, associated with the fielded engine 104. In various aspects, determining the fundamental mode placements can include determining the values of the natural frequencies and/or critical modes associated with operation of the fielded engine 104, based on the fielded engine data 110. In various embodiments, the natural frequencies can be obtained and/or derived from the fielded engine data 110 using any suitable mathematical, computational, and/or statistical technique (e.g., modal analysis techniques). In some instances, the fundamental mode placements (e.g., natural frequencies) can be obtained from a Fast Fourier Transform (FFT) graph, such as those discussed below in conjunction with the blade passing frequency analysis 116. Once obtained, the fundamental mode placements (e.g., natural frequencies) can be compared to baseline mode placements (e.g., natural frequencies corresponding to proper/healthy operation of the fielded engine 104) derived from the baseline engine data 106. In various instances, each rotor of the fielded engine 104 can have its own associated natural frequencies, and the fielded engine 104 can have its own collective natural frequencies that can depend on which rotors are currently operating. These natural frequencies (e.g., for both the overall engine and the constituent rotors) can change over time due to a variety of factors, such as wear and tear, damage, and rubbing. In various cases, different changes in the fundamental mode placements of the fielded engine 104 can correspond to different types of rubbing. For instance, axial rubbing of a first rotor in the fielded engine 104 can correspond to a certain change in the fundamental mode placements of the fielded engine 104 (e.g., shifting the natural frequencies up by a certain amount of Hz), while radial rubbing of a second rotor can cause a different change in the fundamental mode placements (e.g., shifting the natural frequencies down by a certain amount of Hz). As another example, a combination of axial and radial rubbing of one or more rotors can correspond to some other change in the fundamental mode placements. By comparing the fundamental mode placements (e.g., the measured operational frequencies in Hz) with the baseline mode placements (e.g., baseline natural frequencies in Hz), the mode placement analysis 114 can determine how the mode placement of the fielded engine 104 has changed over time and can detect and/or predict certain types of rubs that correspond to the determined change. In various embodiments, a machine learning algorithm can be used to facilitate pattern recognition in comparing the fundamental and baseline mode placements. In various cases, the machine learning algorithm can be trained (e.g., via supervised learning, unsupervised learning, reinforcement learning, and so on) to recognize which mode placement changes correspond to which types and/or severities of rubs.

In various aspects, the blade passing frequency analysis 116 can include determining, from the fielded engine data 110, one or more vibration spectra (e.g., vibration amplitude as a function of frequency) of the fielded engine 104. In various instances, this can include measuring vibration amplitude of one or more components of the fielded engine 104 as a function of time (e.g., via accelerometers) and applying a Fast Fourier Transform (FFT) to convert the amplitude measurements from the time-domain to the frequency domain. In various embodiments, any suitable algorithm that mathematically converts time-domain signals to the frequency-domain can be used (e.g., Fourier transform, Fourier series, Laplace transform, Z transform, Wavelet transform, and so on). In various instances, the fielded engine 104 can exhibit a different vibration spectrum based on the number and/or position of rotors operating in the engine (e.g., a first vibration spectrum with only stage 1 rotors operating, a second vibration spectrum with stage 1 and stage 2 rotors operating, and so on) Once obtained, the vibration spectra (e.g., FFT signatures) associated with the fielded engine 104 can be compared to one or more baseline vibration spectra (e.g., FFT signatures corresponding to proper/healthy operation of the fielded engine 104) derived from the baseline engine data 106. In various instances, this comparison can include superimposing one or more of the vibration spectra associated with the fielded engine 104 over and/or on top of one or more of the baseline vibration spectra. In various aspects, this superposition can be analyzed by a trained machine learning pattern recognition algorithm. As mentioned above, different types and/or severities and/or locations of engine rubs can exhibit different symptoms (e.g., some types and/or severities of rubs can manifest as heightened vibration amplitudes at a first set of frequencies, while other types and/or severities of rubs can manifest as lowered vibration amplitudes at some other set of frequencies, and so on). In various cases, the machine learning algorithm can be trained (e.g., via supervised learning, unsupervised learning, reinforcement learning, and so on) to identify a particular type and/or severity of rub based on the superposition (e.g., based on the comparison of the operational vibration signatures with the baseline vibration signatures).

In various aspects, the operation parameter analysis 118 can include comparing the real-time operation parameters of the fielded engine 104 (e.g., the temperature measurements, pressure measurements, voltage measurements, current measurements, air/fuel mass flow rate measurements, stress/strain measurements, and so from the fielded engine data 110) with baseline operation parameters (e.g., baseline temperature measurements, pressure measurements, voltage measurements, current measurements, air/fuel mass flow rate measurements, stress/strain measurements, and so on that correspond to proper/healthy performance of the fielded engine 104), derived from the baseline engine data 106. In one or more instances, this comparison can include tracking change in core speed (e.g., $\Delta N2$) versus change in exhaust gas temperature (e.g., $\Delta EGT$), and/or core vibration (e.g., N2 Vibe) versus discharge pressure (e.g., PS3). In various aspects, this comparison can be performed by a trained machine learning pattern recognition algorithm. As mentioned above, different types and/or severities and/or locations of engine rubs can exhibit different symptoms (e.g., some types and/or severities of rubs can manifest as heightened temperature and/or pressure measurements of certain engine components, while other types and/or severities of rubs can manifest as lowered voltage and/or current measurements associated with other engine components, and so on). In various cases, the machine learning algorithm can be trained (e.g., via supervised learning, unsupervised learning, reinforcement learning, and so on) to identify a particular type and/or severity of rub based on the comparison of the real-time operation parameters with the baseline operation parameters.

In various embodiments, a trained machine learning and/or pattern recognition algorithm can include any suitable mathematical, statistical, and/or computational classification technique. For instance, in various embodiments, a trained machine learning and/or pattern recognition algorithm can include any suitable mathematical, statistical, and/or computational technique that can be trained (e.g., via supervised learning on known data sets) to classify an input data set into one or more output classifications (e.g., to detect patterns and/or signatures in an input data set and to correlate the detected patterns and/or signatures to one or more states of the input data set). For example, a machine learning and/or pattern recognition algorithm can be trained (e.g., via supervised learning, unsupervised learning, reinforcement learning, and so on) to correlate a particular input data set including mode placements, FFT spectrums, and operation parameters of an engine with a particular type, severity, and/or location of rubbing within that engine. In various embodiments, a trained machine learning and/or pattern recognition algorithm can comprise one or more linear classifiers (e.g., generative classifiers such as Naïve Bayes, linear discriminant analysis, and so on; discriminative classifiers such as logistic regression, perceptron, support vector machines, and so on; linear affine transformations optimized to achieve global minima; and so on). In various embodiments, a trained machine learning and/or pattern recognition algorithm can comprise one or more non-linear classifiers (e.g., artificial neural networks, non-linear and/or high dimensional support vector machines, and so on).

To facilitate the above-described machine learning aspects of various embodiments of the subject claimed innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute, and so on) of the present innovation, components of the present innovation can examine the entirety or a subset of the data to which it is granted access and can provide for reasoning about or determine states of the system, environment, and so on from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

As explained above, none of mode placement change, vibration signature change, and operation parameter change is necessarily a symptom of every possible type of rub. Again, different types and/or severities and/or locations of rubs between different components of the fielded engine 104 can exhibit different symptoms. For instance, a severe axial rub of a first rotor can correspond to some magnitude of change in fundamental mode placement, a moderate radial rub of a second rotor can correspond to some different magnitude of change in vibration spectra, and a light combination rub of a third rotor can correspond to some still different magnitude of change in operation parameters. In various aspects, different types and/or severities of rubs between different components of the fielded engine 104 can correspond to different changes in different combinations of mode placement, vibration signature, and/or operation parameters. Additionally, in various cases, mode placements, vibration signatures, and/or operation parameters can change even in the absence of engine rubbing (e.g., changes caused by other problems and/or environmental conditions, and so on). Thus, the combination of all three types of analyses into a single engine rub diagnostics paradigm can accurately detect/predict a wider array of rubs than can any one of these analyses alone. Such a three-pronged analysis can therefore improve the efficacy of rub detection/prediction, reduce a number of false positive and/or false negative rub indications, and allow for the accurate categorization/characterization of detected/predicted rubs.

In various embodiments, each of the mode placement analysis 114, the blade passing frequency analysis 116, and the operation parameter analysis 118 can output one or more values (e.g., scalars, vectors, matrices, and so on) quantifying their respective comparisons (e.g., the one or more values outputted by the mode placement analysis 114 can quantify the comparison between the fundamental mode placements of the fielded engine 104 and the baseline mode placements, the one or more values outputted by the blade passing frequency analysis 116 can quantify the comparison between the operational vibration spectra of the fielded engine 104 and the baseline vibration spectra, and so on). In various aspects, these one or more values can be generated by the respective trained machine learning algorithms, and so these values can represent indications of the type, severity, and/or location of detected/predicted rubs. In various instances, the analysis component 112 can statistically combine (e.g., via a weighted average, and so on) the one or more values outputted by each of the three analyses to yield a core rub indicator 120 (e.g., a continuous and/or discrete scalar value). In one or more embodiments, any suitable mathematical, computational, and/or statistical technique for combining the one or more values from the three analyses into a single scalar can be implemented. In various cases, the core rub indicator 120 can be tracked and/or plotted over time to detect, predict, and/or categorize engine rubbing. In various embodiments, the core rub indicator 120 can be a vector and/or other array. In various instances, one or more first elements in the vector/array can correspond to an overall likelihood of rubbing. In such embodiments, the first elements corresponding to rub likelihood can be continuous scalars and can be plotted over time to detect and/or predict engine rubs. In various embodiments, one or more second elements can be included in the vector/array and can correspond to a type of rubbing. In various aspects, the second elements can be discrete scalars used to identify, categorize, and/or characterize the type of detected and/or predicted engine rubs (e.g., 0 represents radial rubbing, 1 represents axial rubbing, 2 represents combination rubbing, 3 represents partial rubbing, 4 represents full annular rubbing, and so on). In various instances, one or more third elements can be included in the vector/array to identify a severity of the detected/predicted rub (e.g., light, heavy, blade loss, and so on). Such third elements can, in some cases, be discrete scalars (e.g., 0 represents light rubbing, 1 represents heavy rubbing, 2 represents blade loss, and so on). In various other cases, the third elements can be continuous to better indicate gradations of severity (e.g., values closer to 1 can indicate higher severity while values closer to zero can indicate less severity, and so on). In some cases, one or more fourth elements can be included in the vector/array to identify which rotor of the fielded engine 104 is afflicted by the detected/predicted rub (e.g., 1 can represent that rotor 1 is affected, 2 can represent that rotor 2 is affected, and so on). In various embodiments, the core rub indicator 120 can be any scalar, vector, matrix, and/or so on that can detect and/or predict a type and/or severity and/or location of rubbing of the fielded engine 104.

In one or more embodiments, the core rub diagnostic system 102 can, via a classification component 122, generate a rub classification report based on the core rub indicator 120. In various embodiments, the rub classification report can indicate a presence of rubbing between a rotor and a stator or between a rotor and another rotor of the fielded engine 104, or rubbing between any other components of the fielded engine 104. In various instances, the classification component 122 can categorize and/or characterize the detected/predicted rubbing (e.g., as light, heavy, severe, and so on; as axial, radial, combination, and so on). In various aspects, the classification component 122 can identify which of one or more rotors of the fielded engine 104 are currently experiencing the detected rub and/or are about to experience the predicted rub. In various cases, the classification component 122 can employ a random forest algorithm to analyze the core rub indicator 120.

As explained above, since the analysis component 112 can utilize trained machine learning pattern recognition algorithms, and since different types and/or severities of rubs on different rotors can exhibit different patterns of symptoms (e.g., different mode placement signatures, different vibration spectra signatures, different operation parameter signatures, and so on), the analysis component 112 can, in various cases, be trained to be recognize which type and/or severity of rub is afflicting (or about to afflict) which rotor of the fielded engine 104 based on comparing the fielded engine data 110 with the baseline engine data 106.

In one or more embodiments, the core rub diagnostic system 102 can prepare a request for borescope inspection 124 for the fielded engine 104, based on the rub classification report and/or the core rub indicator 120. In various instances, the core rub diagnostic system 102 can prepare a request for any other type of maintenance and/or servicing that is appropriate in view of the detected and/or predicted rubs. In some aspects, the core rub diagnostic system 102 can short-list the fielded engine 104 for potential inspection and/or potential servicing.

Figure 2:
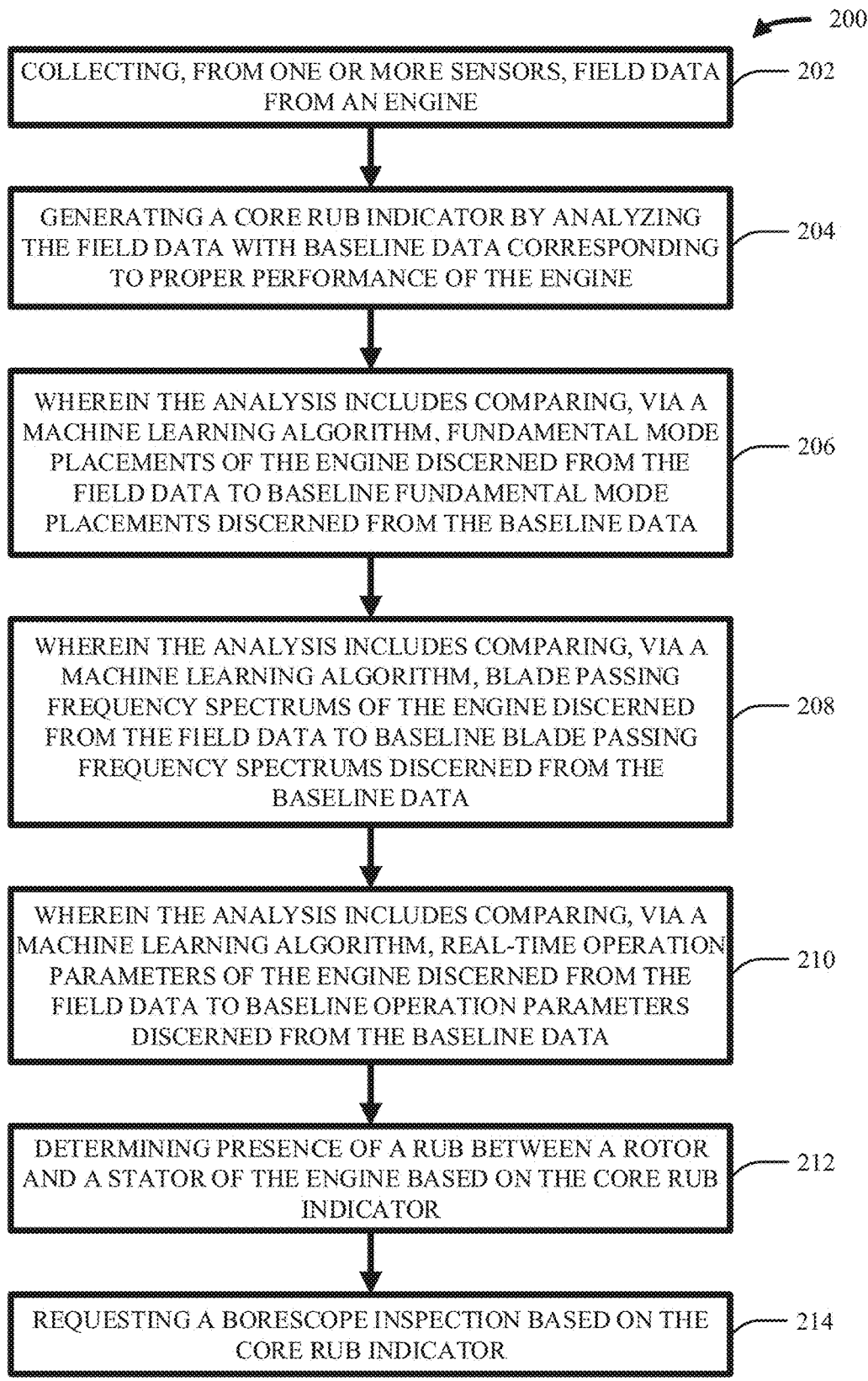
FIG. 2 illustrates a high-level flow diagram of an example, non-limiting computer-implemented method that facilitates predictive core rub diagnostics in accordance with one or more embodiments described herein.

FIG. 2 illustrates a high-level flow diagram of an example, non-limiting computer-implemented method 200 that can facilitate predictive core rub diagnostics in accordance with one or more embodiments described herein. In some cases, the computer-implemented method 200 can be implemented by the system 100.

In various embodiments, act 202 can comprise collecting (e.g., via the sensor component 108), from one or more sensors, field data (e.g., fielded engine data 110) from an engine (e.g., fielded engine 104).

In various instances, act 204 can comprise generating a core rub indicator (e.g., core rub indicator 120) by analyzing (e.g., via the analysis component 112) the field data with baseline data corresponding to proper performance of the engine (e.g., baseline engine data 106).

In various aspects, act 206 can comprise wherein the analysis includes comparing, via a machine learning algorithm, fundamental mode placements of the engine discerned from the field data to baseline fundamental mode placements discerned from the baseline data (e.g., mode placement analysis 114).

In various embodiments, act 208 can comprise wherein the analysis includes comparing, via a machine learning algorithm, blade passing frequency spectrums of the engine discerned from the field data to baseline blade passing frequency spectrums discerned from the baseline data (e.g., blade passing frequency analysis 116).

In various instances, act 210 can comprise wherein the analysis includes comparing, via a machine learning algorithm, real-time operation parameters of the engine discerned from the field data to baseline operation parameters discerned from the baseline data (e.g., operation parameter analysis 118).

In various aspects, act 212 can comprise determining (e.g., via the classification component 122) presence of a rub between a rotor and a stator of the engine based on the core rub indicator.

In various embodiments, act 214 can comprise requesting a borescope inspection based on the core rub indicator (e.g., request for borescope inspection 124).

Figure 3:
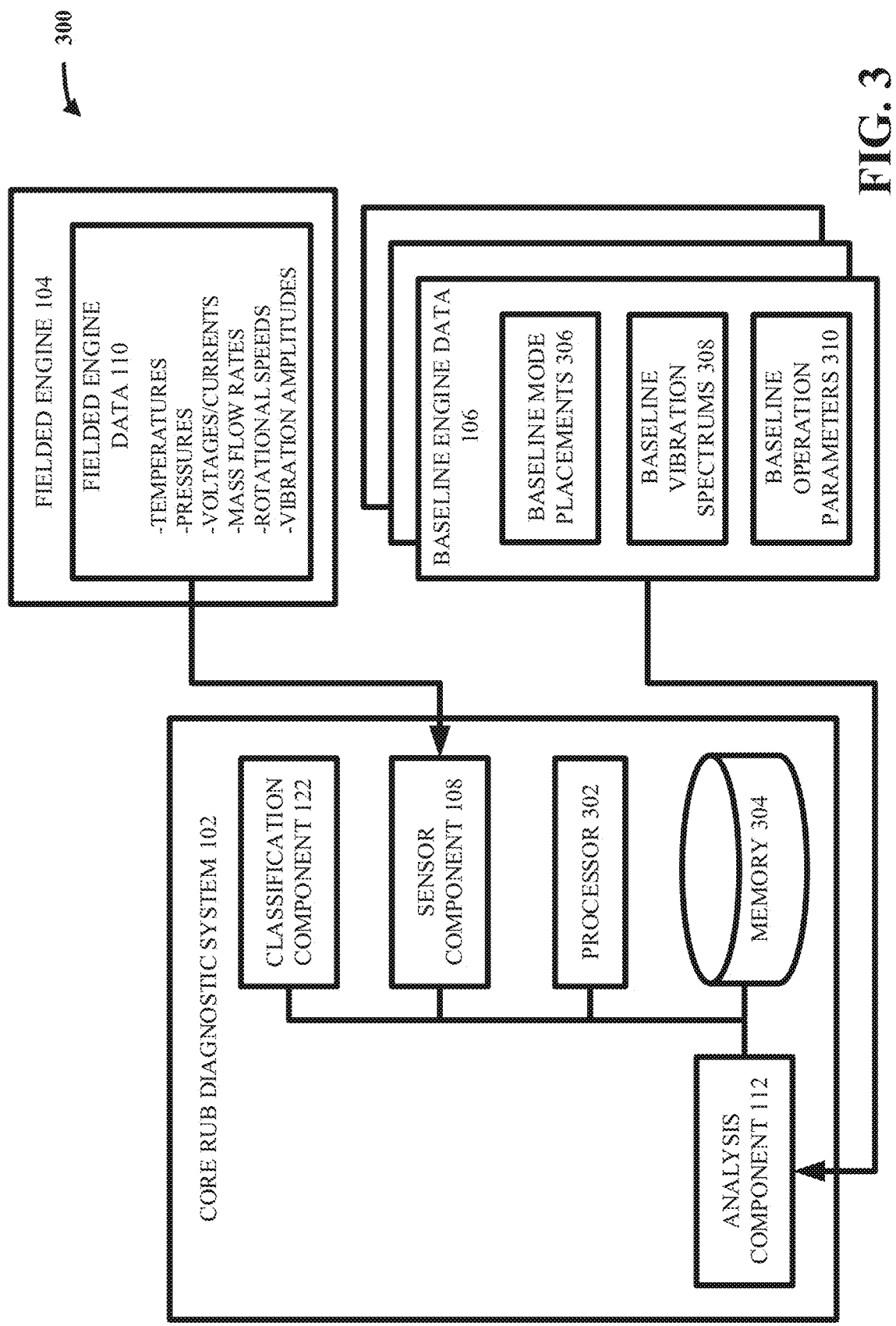
FIG. 3 illustrates a block diagram of an example, non-limiting system that facilitates predictive core rub diagnostics in accordance with one or more embodiments described herein.

FIG. 3 illustrates a block diagram of an example, non-limiting system 300 that can facilitate predictive core rub diagnostics in accordance with one or more embodiments described herein.

As shown, the core rub diagnostic system 102 can leverage baseline engine data 106 to detect, predict, and/or categorize rubs in the fielded engine 104. As shown, the fielded engine data 110 of the fielded engine 104 can include, in various embodiments, temperatures, pressures, voltages, currents, air/fuel mass flow rates, rotational speeds, vibration amplitudes, and so on associated with the fielded engine 104. As shown, the baseline engine data 106 can include baseline mode placements 306 (e.g., natural frequencies corresponding to healthy performance of the fielded engine 104), baseline vibration spectrums 308 (e.g., FFT signatures corresponding to healthy performance of the fielded engine 104), and/or baseline operation parameters 310 (e.g., measurements of temperature, pressure, voltage, current, air/fuel mass flow rate, rotational speed, vibration amplitude, stress/strain, and so on corresponding to healthy performance of the fielded engine 104).

In various embodiments, the core rub diagnostic system 102 can comprise a processor 302 (e.g., computer processing unit, microprocessor, and so on) and a computer-readable memory 304 that is operably and/or operatively and/or communicatively connected/coupled to the processor 302. The memory 304 can store computer-executable instructions which, upon execution by the processor 302, can cause the processor 302 and/or other components of the core rub diagnostic system 102 (e.g., sensor component 108, analysis component 112, classification component 122, and so on) to perform one or more acts. In various embodiments, the memory 304 can store computer-executable components (e.g., sensor component 108, analysis component 112, classification component 122, and so on), and the processor 302 can execute the computer-executable components.

In one or more embodiments, and as explained above, the core rub diagnostic system 102 can, via the sensor component 108, detect the fielded engine data 110 (e.g., the sensor component 108 can detect real-operation parameters that characterize the current performance of the fielded engine 104).

In various aspects, and as explained above, the analysis component 112 can generate, from the fielded engine data 110, fundamental mode placements, vibration spectra, and real-time operation parameters associated with the current operation of the fielded engine 104. The analysis component can then respectively compare these fundamental mode placements, vibration spectra, and real-time operation parameters with the baseline mode placements 306, the baseline vibration spectrums 308, and the baseline operation parameters 310. In various cases, based on these comparisons, the analysis component 112 can determine respective changes in the fundamental mode placements, vibration spectra, and real-time operation parameters as measured against the baseline mode placements 306, baseline vibration spectrums 308, and baseline operation parameters 310. In various embodiments, and as explained above, the analysis component 112 can employ a trained machine learning algorithm that can recognize which types, severities, and/or locations of rubs correspond to the determined changes (e.g., the machine learning algorithm can identify a type, severity, and/or location of rubbing in the fielded engine 104 that corresponds to the particular patterns/signatures/anomalies detected in the comparisons of current and baseline mode placements, current and baseline vibration spectra, and current and baseline operation parameters). In various cases, the analysis component 112 can statistically combine the results of the three above comparisons to yield a rub indicator (e.g., core rub indicator 120).

In various embodiments, the core rub diagnostic system 102 can, via the classification component 122, generate a rub classification report, based on the rub indicator, that indicates a presence of rubbing between components of the fielded engine 104.

Figure 4:
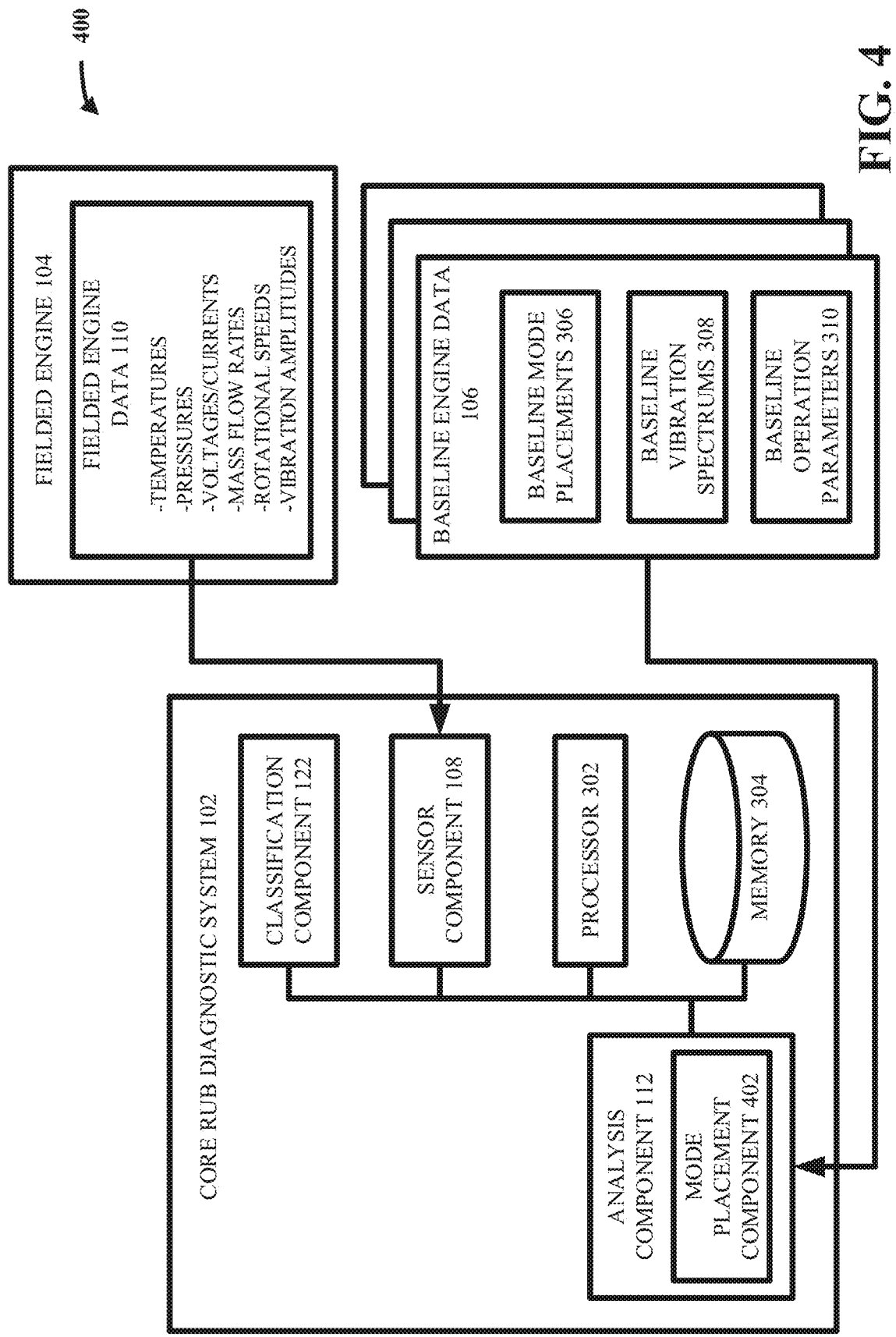
FIG. 4 illustrates a block diagram of an example, non-limiting system including a mode placement component that facilitates predictive core rub diagnostics in accordance with one or more embodiments described herein.

FIG. 4 illustrates a block diagram of an example, non-limiting system 400 including a mode placement component that can facilitate predictive core rub diagnostics in accordance with one or more embodiments described herein. As shown, the system 400 can, in various embodiments, comprise the same components as the system 300, and can further comprise a mode placement component 402.

In various embodiments, the mode placement component 402 can facilitate the mode placement analysis 114, described above. In one or more embodiments, the mode placement component 402 can determine, via any suitable mathematical, computational, and/or statistical technique (e.g., FFT), fundamental mode placements (e.g., operational natural frequencies) of the fielded engine 104 from the fielded engine data 110. In other words, the mode placement component 402 can determine one or more sets of natural frequencies associated with various components of the fielded engine 104 (e.g., natural frequencies of a first rotor, natural frequencies of a second rotor, and so on) as well as one or more sets of collective natural frequencies associated overall with the fielded engine 104. A natural frequency can represent the frequency (e.g., Hz) at which a system tends to oscillate in the absence of any driving or damping force (e.g., operational frequency of vibration of a system without external excitation of and/or interference with the system). The natural frequencies of the fielded engine 104 can change over time (e.g., change with use). In various instances, these changes in natural frequencies (e.g., changes in fundamental mode placements) can correspond to rubs in the fielded engine 104. Indeed, in various aspects, different extents of changes in fundamental mode placements can correspond to different types, severities, and/or locations of different rubs. For example, a light axial rub of a stage 1 rotor in the fielded engine 104 can correspond to a certain increase in the natural frequencies of the fielded engine 104, a moderate radial rub of a stage 2 rotor in the fielded engine 104 can correspond to a different increase in the natural frequencies of the fielded engine 104, and a heavy combination rub of a stage 3 rotor can correspond to a still different change in the natural frequencies of the fielded engine 104, and so on. The mode placement component 402 can learn these correspondences via training (e.g., supervised learning using mode placement signatures known to correspond to particular types, severities, and/or locations of rubs). In various cases, the mode placement component 402 can determine fundamental mode placements of the fielded engine 104 based on the fielded engine data 110, can compare the determined fundamental mode placements with the baseline mode placements 306, and can identify, based on the comparison, a type and/or severity and/or location of rub in the fielded engine 104. In various aspects, the mode placement component 402 can leverage trained machine learning pattern recognition to identify which types, severities, and/or locations of rubs correspond to the patterns/signatures/anomalies detected via the current and baseline mode placement comparison.

Figure 5:
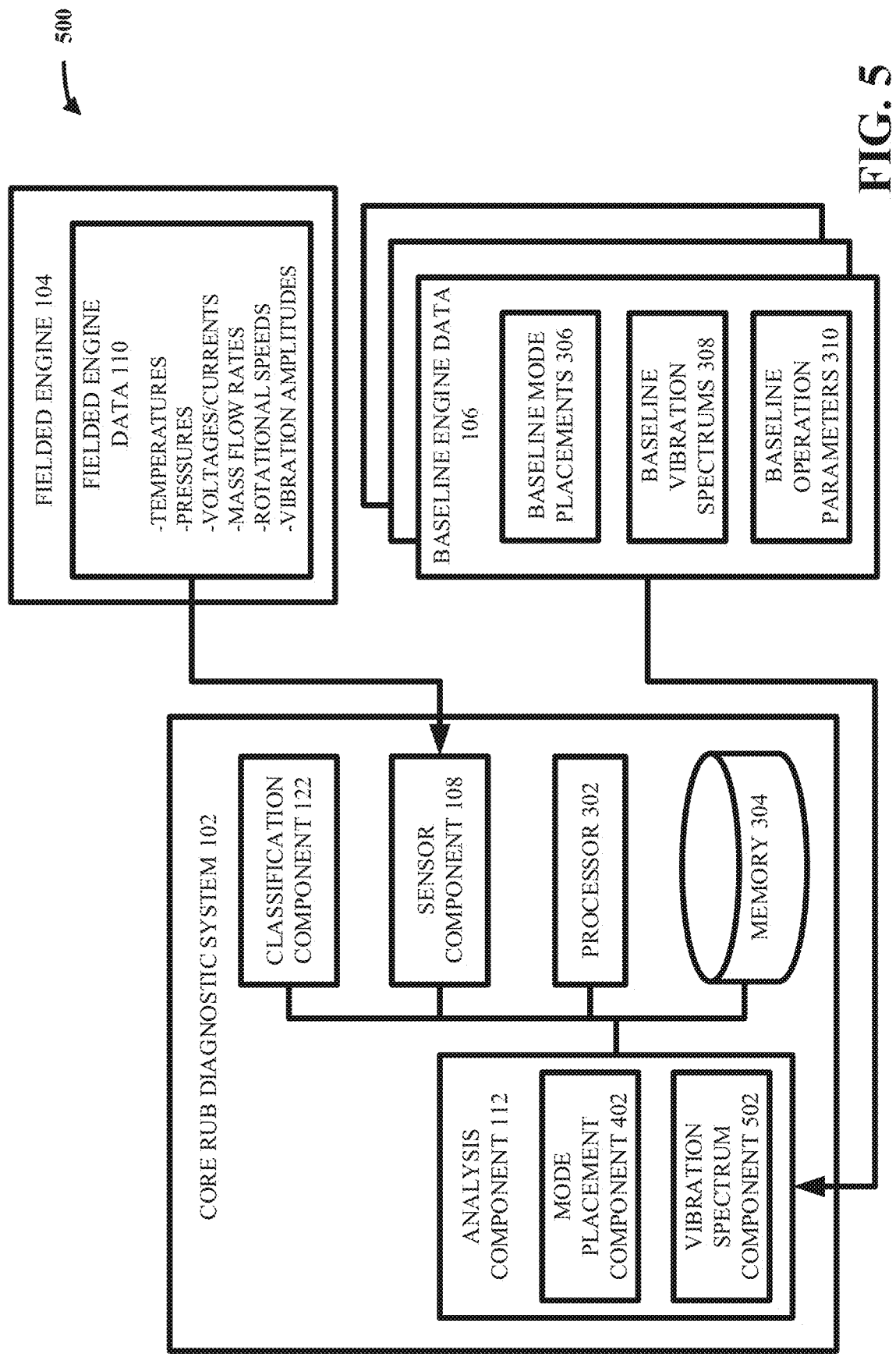
FIG. 5 illustrates a block diagram of an example, non-limiting system including a vibration spectrum component that facilitates predictive core rub diagnostics in accordance with one or more embodiments described herein.

FIG. 5 illustrates a block diagram of an example, non-limiting system 500 including a vibration spectrum component that can facilitate predictive core rub diagnostics in accordance with one or more embodiments described herein. As shown, the system 500 can, in various embodiments, comprise the same components as the system 400, and can further comprise a vibration spectrum component 502.

In various embodiments, the vibration spectrum component 502 can facilitate the blade passing frequency analysis 116, described above. In one or more embodiments, the vibration spectrum component 502 can determine, via any suitable mathematical, computational, and/or statistical technique (e.g., FFT, power spectral density, spectrogram, and so on), vibration spectrums (e.g., vibration amplitude as a function of vibration frequency) of the fielded engine 104 from the fielded engine data 110. In other words, the vibration spectrum component 502 can determine one or more frequency-domain vibration signatures associated with the fielded engine 104. One way of analyzing vibrations of a system is to measure amplitude (e.g., distance) as a function of time (e.g., called time-domain analysis). Although real-world vibrations are often very complicated in the time-domain, they can be expressed as series (e.g., summations) of simple sinusoids (e.g., sine, cosine, and so on) having different amplitudes and frequencies. Analyzing vibrations in the frequency-domain can simplify the analysis and help to identify the amplitudes and frequencies of the constituent sinusoids that combine to yield the overall vibration. The frequency-domain vibration signatures of the fielded engine 104 can change over time (e.g., change with use). In various instances, these changes in frequency-domain vibration signatures (e.g., different changes in amplitude at different frequencies) can correspond to rubs in the fielded engine 104. Indeed, in various aspects, different extents of changes in the frequency-domain vibration signatures can correspond to different types, severities, and/or locations of different rubs. For example, a heavy axial rub of a stage 1 rotor in the fielded engine 104 can correspond to a certain increase in vibration amplitude at a certain frequency, a light radial rub of a stage 2 rotor in the fielded engine 104 can correspond to a different increase in vibration amplitude at a different frequency, and a moderate combination rub of a stage 3 rotor in the fielded engine 104 can correspond to a still different vibration amplitude at a still different frequency, and so on. The vibration spectrum component 502 can learn these correspondences via training (e.g., supervised learning using frequency-domain vibration signatures known to correspond to particular types, severities, and/or locations of rubs). In various cases, the vibration spectrum component 502 can determine one or more vibration spectrums (e.g., frequency-domain vibration signatures) of the fielded engine 104 based on the fielded engine data 110, can compare the determined vibration spectrums with the baseline vibration spectrum 308, and can identify, based on the comparison, a type and/or severity and/or location of rub in the fielded engine 104. In various aspects, the vibration spectrum component 502 can leverage trained machine learning pattern recognition to identify which types, severities, and/or locations of rubs correspond to the patterns/signatures/anomalies detected via the current and baseline vibration spectrum comparison.

Figure 6A:
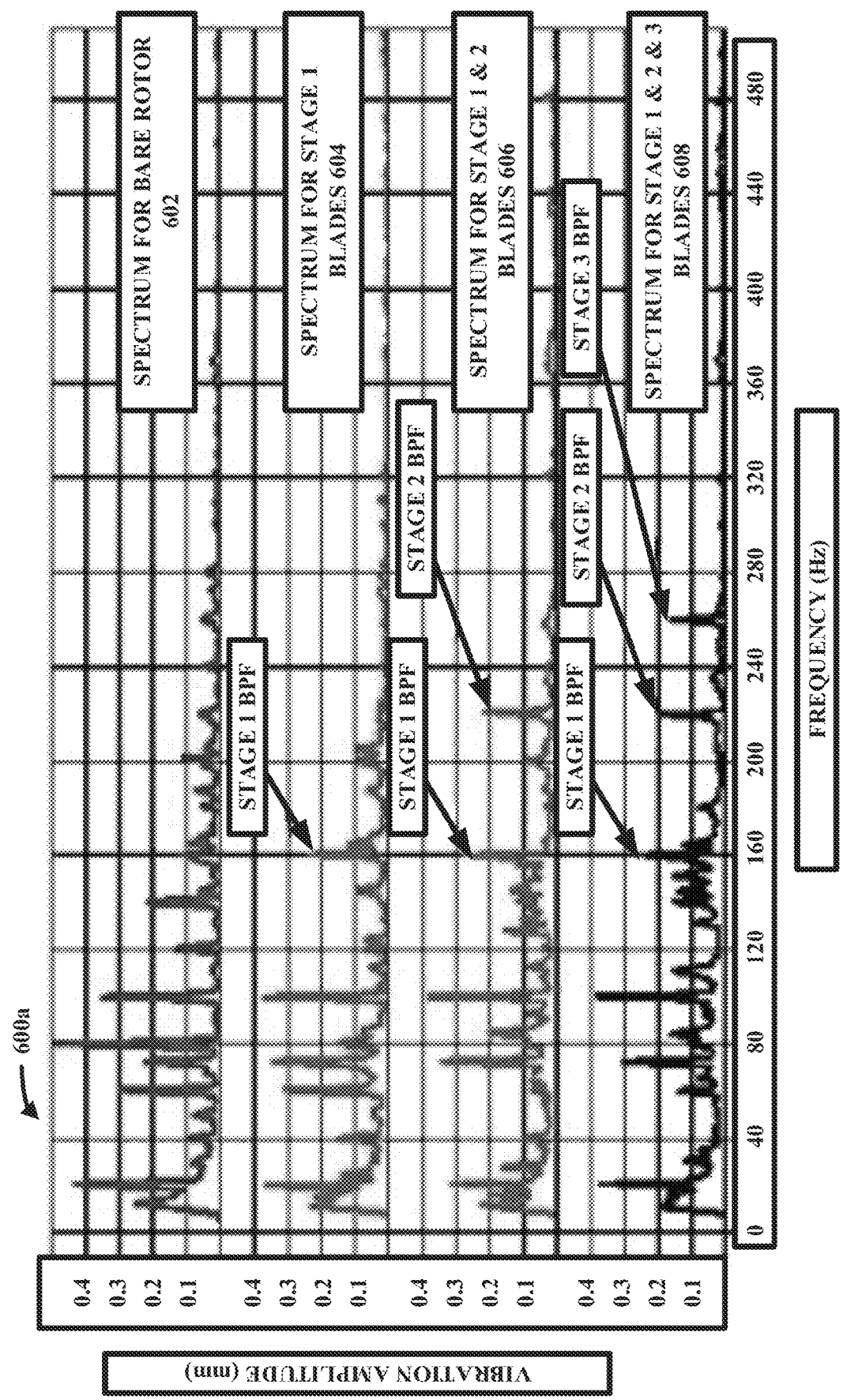
FIGS. 6A-C illustrate exemplary color graphs that demonstrate superposition of vibration spectra in accordance with one or more embodiments described herein.
Figure 6B:
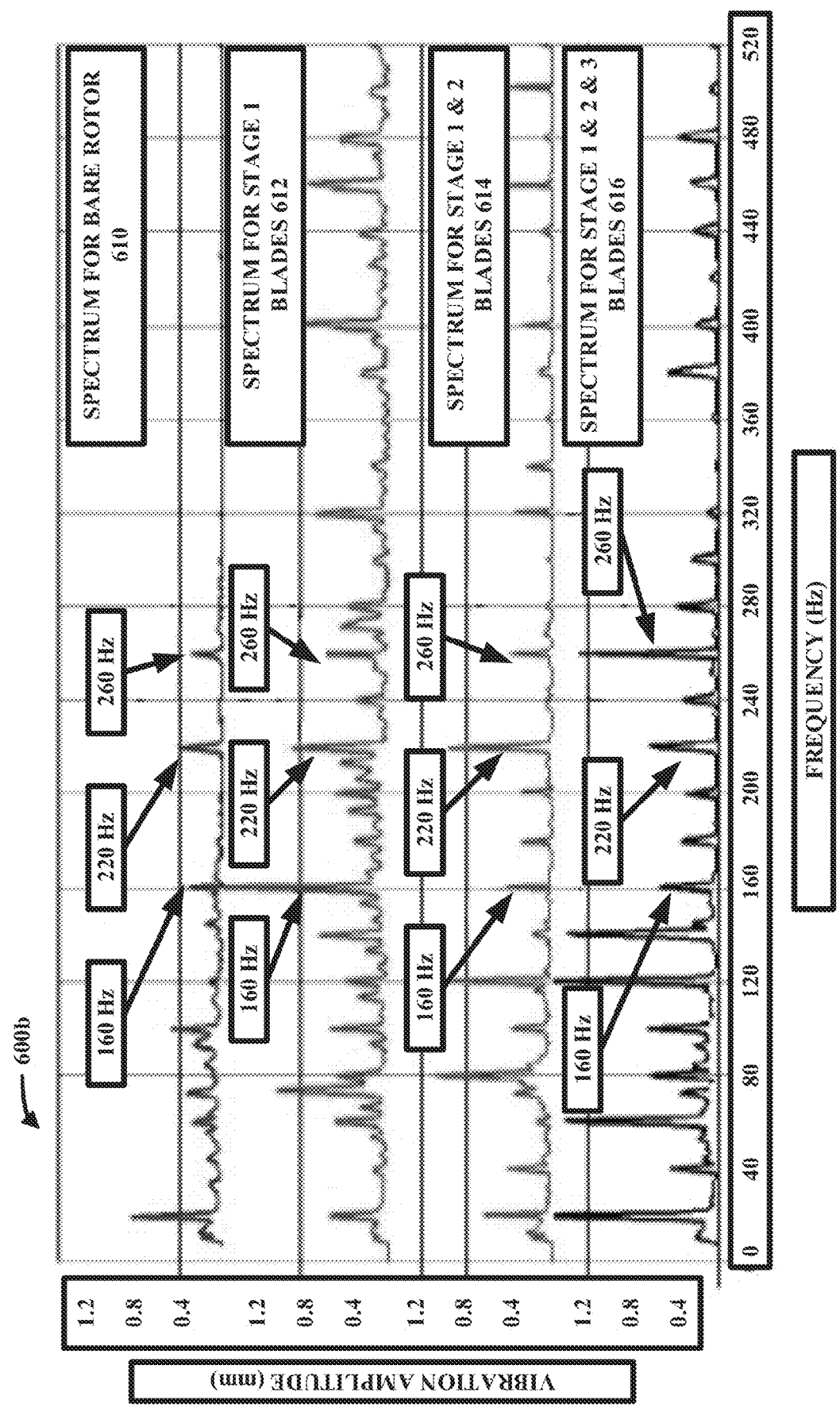
Figure 6C:
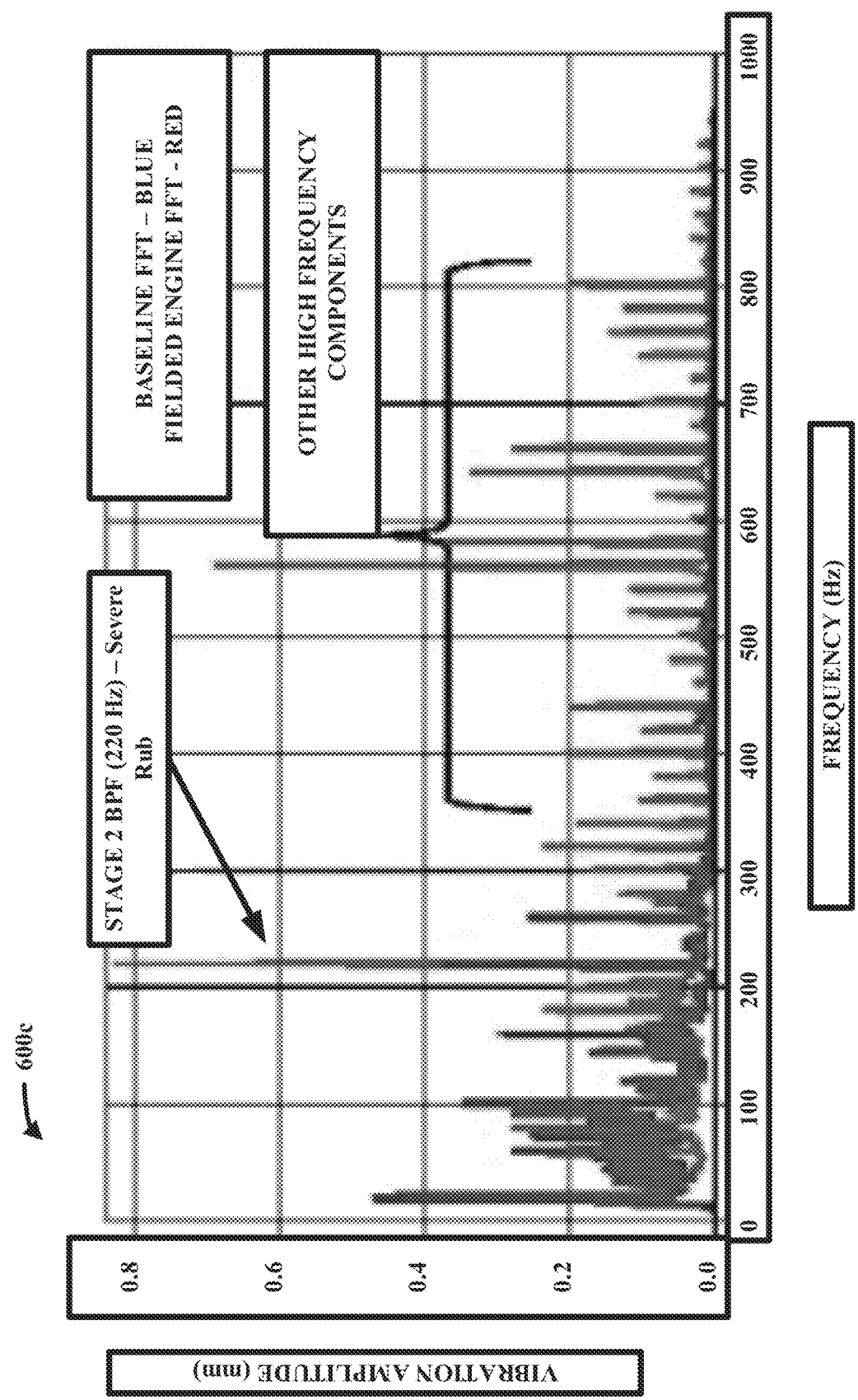

FIGS. 6A-C illustrate exemplary graphs 600a, 600b, and 600c that demonstrate superposition of vibration spectra in accordance with one or more embodiments described herein. The values presented in FIGS. 6A-C are exemplary only.

FIG. 6A depicts an exemplary graph 600a of vibration spectrums (e.g., FFT signatures) that correspond to proper and/or healthy performance of the fielded engine 104. That is, FIG. 6A depicts exemplary graphs of baseline vibration spectrums 308. As shown, graph 600a possesses four subplots (e.g., 602, 604, 606, and 608). As shown, subplot 602 represents an FFT spectrum for a bare rotor in a healthy version of the fielded engine 104. As can be seen, significant vibration components (e.g., amplitude greater than or equal 0.2 mm) exist at about 10 Hz, 20 Hz, 60 Hz, 70 Hz, 80 Hz, 100 Hz, and 140 Hz. Subplot 604 represents an FFT spectrum for the fielded engine 104 when stage 1 rotors are operating. As can be seen, the vibration components at about 10 Hz, 20 Hz, 60 Hz, and 100 Hz remain substantially the same. However, as shown, the operation of the stage 1 rotors can cause the 70 Hz vibration component to substantially increase in amplitude, the 80 Hz vibration component to substantially decrease in amplitude, the 140 Hz vibration component to substantially decrease in amplitude, and a new vibrational component to emerge at 160 Hz, as marked "Stage 1 BPF" on the subplot 604, where "BPF" stands for "blade passing frequency." Subplot 606 represents an FFT spectrum for a healthy version of the fielded engine 104 when stage 1 and stage 2 blades are operating. As can be seen, the vibration component at about 20 Hz decreases somewhat, the vibration component at about 60 Hz disappears, and a new vibration component emerges at about 220 Hz, as marked "Stage 2 BPF" on the subplot 606. Subplot 608 represents an FFT spectrum for a healthy version of the fielded engine 104 when stage 1, stage 2, and stage 3 blades are operating. As can be seen, a new vibration component emerges at about 260 Hz, as marked "Stage 3 BPF" on subplot 608. As shown in FIG. 6A, a vibration spectrum of a healthy version of the fielded engine 104 can depend on the number and/or location of blade stages (e.g., rotors) currently operating within the fielded engine 104. In various embodiments, the baseline vibration spectrums depicted in FIG. 6A can be established using development engines (e.g., tested in controlled settings), by using fielded engine legacy data (e.g., fielded engines already in commercial use), and so on. Although FIG. 6A depicts only three stages of blades, any number of blade stages can be incorporated into various embodiments.

FIG. 6B depicts an exemplary graph 600b of vibration spectrums (e.g., FFT signatures) that correspond to a current operation of the fielded engine 104 (e.g., not necessarily healthy, proper, or optimal performance). That is, FIG. 6A depicts exemplary graphs of vibration spectra derived from the fielded engine data 110. As shown, graph 600b possesses four subplots (e.g., 610, 612, 614, and 616). As shown, subplot 610 represents an FFT spectrum for a bare rotor in the fielded engine 104. As can be seen, the vibrational amplitude of the 20 Hz vibration component is nearly double that shown in subplot 602, the 80 Hz vibration component has disappeared, and new vibration components emerge at about 160 Hz, 220 Hz, and 260 Hz. Note that, as shown in FIG. 6A, 160 Hz can correspond to the Stage 1 BPF, 220 Hz can correspond to the Stage 2 BPF, and 260 Hz can correspond to the Stage 3 BPF. Note how the subplot 610 depicts vibration spikes at these frequencies despite the fact that none of the stage 1, stage 2, or stage 3 blades are operating in the subplot 610. This can, in various embodiments, indicate a certain type, severity, and/or location of rubbing. Subplot 612 represents an FFT spectrum for the fielded engine 104 when the stage 1 blades are operating. As can be seen, the 20 Hz component substantially decreases, the 80 Hz and 140 Hz components reemerge and substantially increase, the 160 Hz component (e.g., corresponding to the Stage 1 BPF) substantially increases (e.g., more than triples), the 220 Hz and 260 Hz components (e.g., respectively corresponding to the Stage 2 BPF and Stage 3 BPF) substantially increase (e.g., nearly double), and several high frequency components emerge (e.g., 320 Hz, 400 Hz, 460 Hz, and so on). Subplot 614 represents an FFT spectrum for the fielded engine 104 when the stage 1 blades and stage 2 blades are operating. As can be seen, a significant 120 Hz component emerges, the 160 Hz component substantially decreases, and the high frequency components substantially decrease. Subplot 616 represents an FFT spectrum for the fielded engine 104 when the stage 1, stage 2, and stage 3 blades are operating. As can be seen, the 20 Hz, 60 Hz, 140 Hz, and 260 Hz components substantially increase, and the high frequency components remain. As shown in FIG. 6B, a vibration spectrum of the fielded engine 104 can depend on the number and/or location of blade stages (e.g., rotors) currently operating within the fielded engine 104. In various embodiments, the vibration spectrums depicted in FIG. 6B can be derived from the fielded engine data 110. Although FIG. 6B depicts only three stages of blades, any number of blade stages can be incorporated into various embodiments.

FIG. 6C depicts an exemplary graph 600c of a vibration spectrum of the fielded engine 104 superimposed over a baseline vibration spectrum corresponding to proper performance (e.g., no rubbing) of the fielded engine 104. As shown, the blue graph can represent the baseline FFT spectrum and the red graph can represent the fielded engine FFT spectrum. As can be seen, the vibration component at about 220 Hz in the fielded engine FFT is more than double the 220 Hz component in the baseline FFT (e.g., over 0.8 mm compared with under 0.4 mm). This can, in various embodiments, indicate a severe rub of the stage 2 blades. As shown, there also exist substantial high-frequency vibration components in the fielded engine FFT, as marked "Other High Frequency Components" in FIG. 6C. As explained above, different types, severities, and/or locations (e.g., stage 1 blades/rotor, stage 2 blades/rotor, stage 3 blades/rotor, and so on) can exhibit different changes (e.g., as measured from baseline engine data 106) in FFT signatures. By superimposing the fielded FFT signatures over the baseline/healthy FFT signatures, these changes can be quantified and correlated (e.g., by a trained machine learning pattern recognition algorithm) to particular types, severities, and/or locations of rubs in the fielded engine 104.

Figure 7:
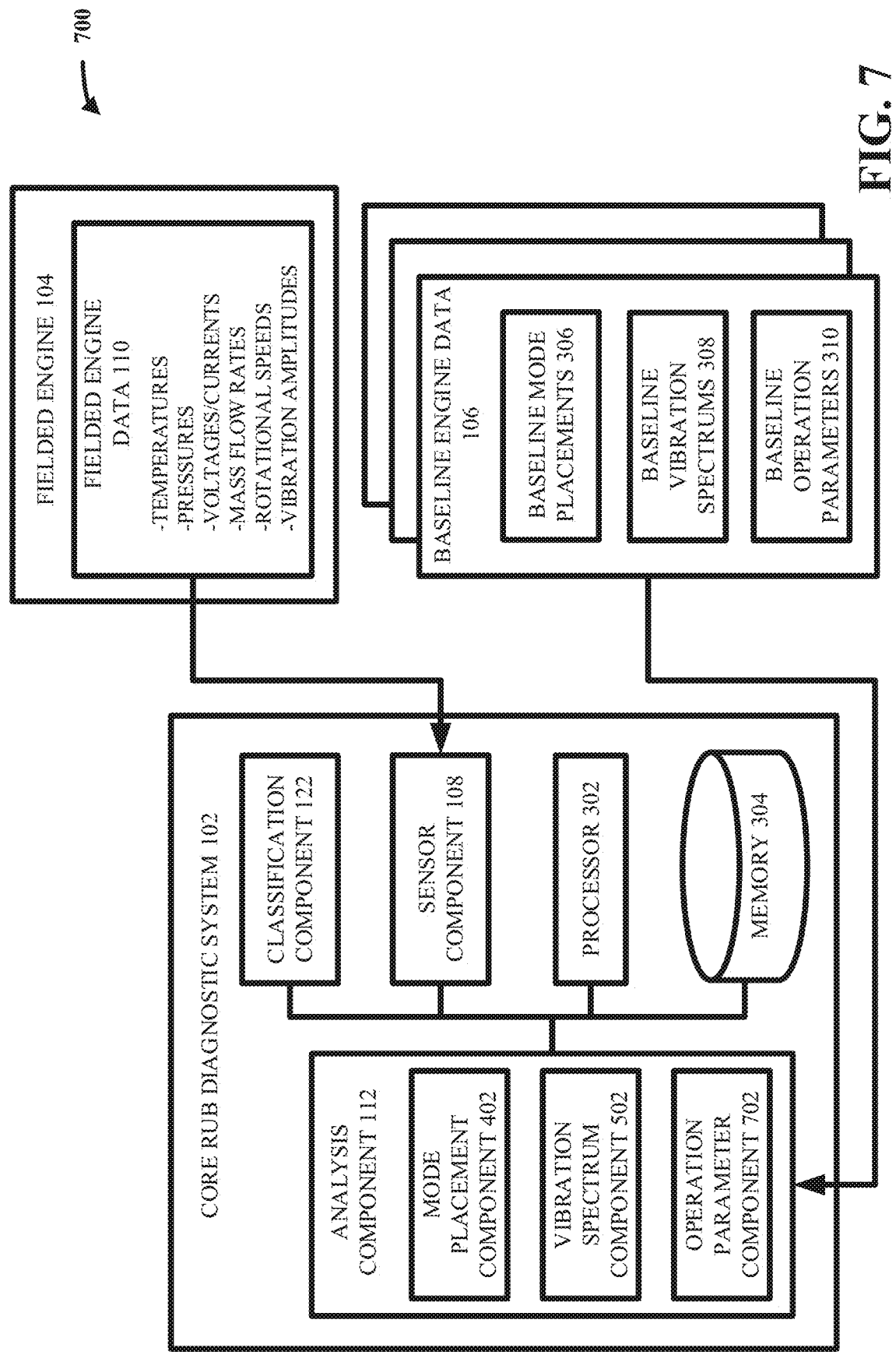
FIG. 7 illustrates a block diagram of an example, non-limiting system including an operation parameter component that facilitates predictive core rub diagnostics in accordance with one or more embodiments described herein.

FIG. 7 illustrates a block diagram of an example, non-limiting system 700 including an operation parameter component that can facilitate predictive core rub diagnostics in accordance with one or more embodiments described herein. As shown, the system 700 can, in various embodiments, comprise the same components as the system 500, and can further comprise an operation parameter component 702.

In various embodiments, the operation parameter component 702 can facilitate the operation parameter analysis 118, described above. In one or more embodiments, the operation parameter component 702 can determine a change in operation parameters of the fielded engine 104 by comparing real-time operation parameters in the fielded engine data 110 with the baseline operation parameters 310. In one or more instances, this comparison can include tracking change in core speed (e.g., ΔN2) versus change in exhaust gas temperature (e.g., ΔEGT) and/or core vibration (e.g., N2 Vibe) versus discharge pressure (e.g., PS3). In various instances, the real-time operation parameters (e.g., operation temperatures, operation pressures, operation voltages, operation currents, operation stresses/strains, operation air/fuel mass flow rates, operation rotational speeds, and so on) of the fielded engine 104 can change over time (e.g., change with use). In various instances, these changes in operation parameters (e.g., increased/decreased operation temperatures, increased/decreased operation pressures, increased/decreased operation voltages, and so on as compared to the baseline operation parameters 310) can correspond to rubs in the fielded engine 104. Indeed, in various aspects, different extents of changes in the real-time operation parameters can correspond to different types, severities, and/or locations of different rubs. For example, a heavy combination rub of a stage 1 rotor in the fielded engine 104 an correspond to a certain change in exhaust gas temperature, a moderate radial rub of a stage 2 rotor in the fielded engine 104 can correspond to a different change in the discharge pressure, and a light axial rub of a stage 3 rotor in the fielded engine 104 can correspond to a still different change in air mass flow rate, and so on. The operation parameter component 702 can learn these correspondences via training (e.g., supervised learning using operation parameter signatures known to correspond to particular types, severities, and/or locations of rubs). In various cases, the operation parameter component 702 can compare real-time operation parameters of the fielded engine 104 (e.g., from the fielded engine data 110) with the baseline operation parameters 310 (e.g., from the baseline engine data 106), and can identify, based on the comparison, a type and/or severity and/or location of rub in the fielded engine 104. In various aspects, the operation parameter component 702 can leverage trained machine learning pattern recognition to identify which types, severities, and/or locations of rubs correspond to the patterns/signatures/anomalies detected via the current and baseline operation parameter comparison.

Figure 8A:
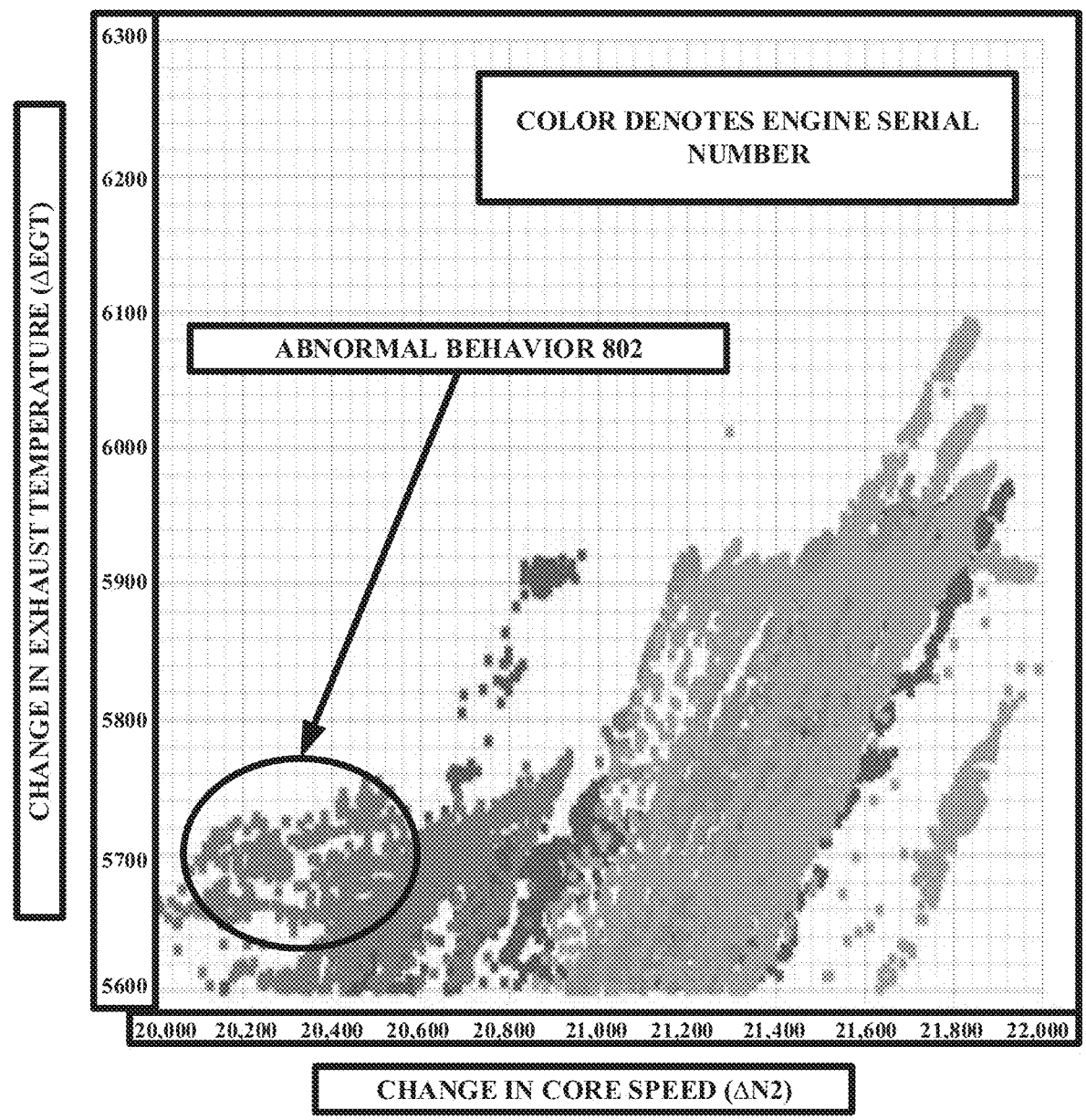
FIGS. 8A-B illustrate exemplary color graphs that demonstrate operation parameter analysis in accordance with one or more embodiments described herein.
Figure 8B:
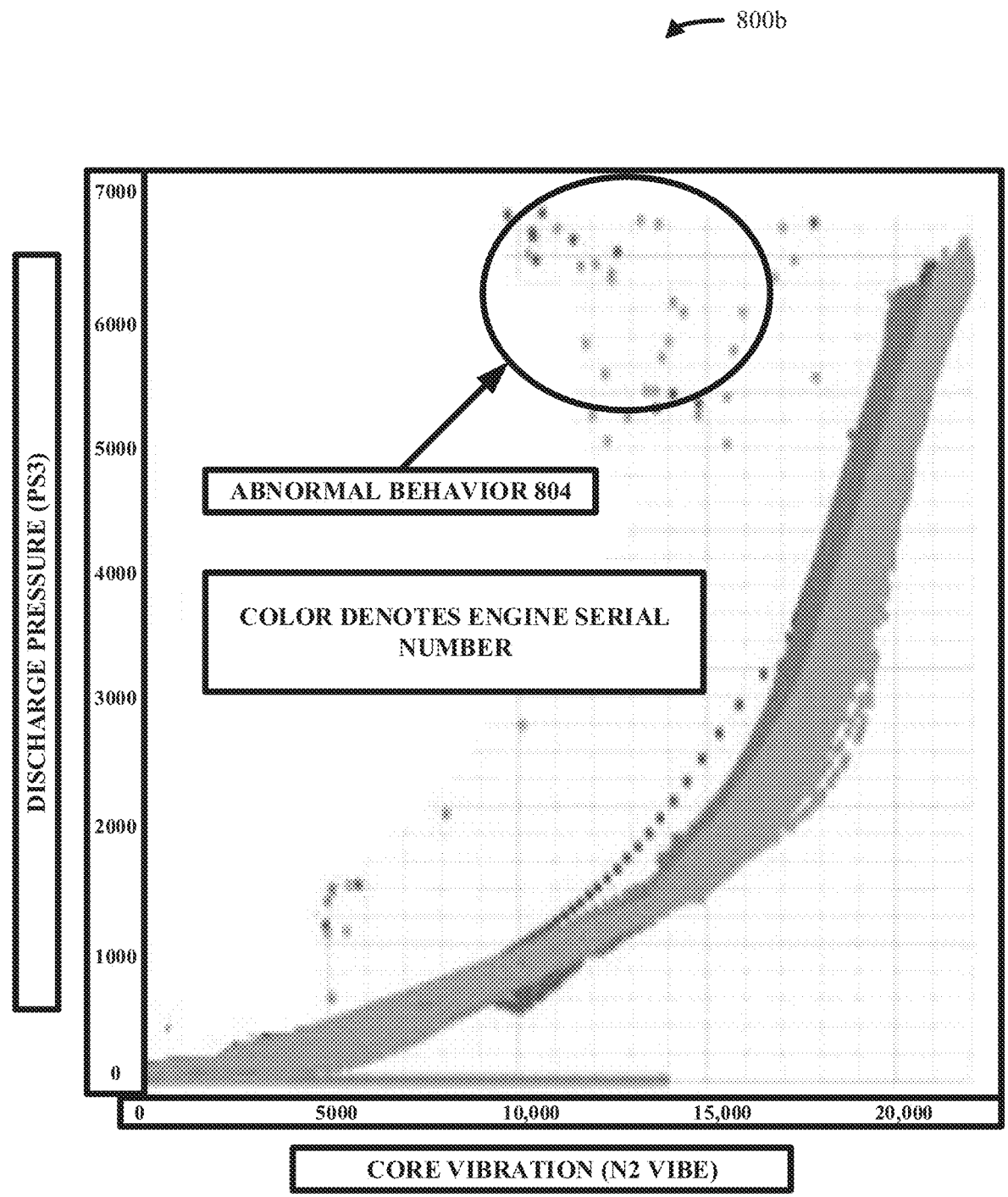

FIGS. 8A-B illustrate exemplary graphs 800a and 800b that demonstrate operation parameter analysis in accordance with one or more embodiments described herein. The values presented in FIGS. 8A-B are exemplary only.

FIG. 8A depicts an exemplary graph 800a of change in exhaust gas temperature (ΔEGT) as a function of change in core speed (ΔN2). The units can be any suitable units (e.g., Fahrenheit, Celsius, Kelvin, or Rankine for temperature; rotations per minute for speed, and so on). As shown, different colors on the graph 800a can correspond to different engine serial numbers (e.g., different makes/models of the fielded engine 104, and/or different iterations of one make/model of the fielded engine 104, and so on). In various embodiments, during actual operation of the fielded engine 104, the change in exhaust gas temperature of the fielded engine 104 can be tracked and plotted against the change in core speed of the fielded engine 104. The plot can then be compared to a baseline plot (e.g., not shown in FIG. 8A) of change in exhaust gas temperature versus change in core speed that corresponds to proper/healthy operation of the fielded engine 104. In various embodiments, the slope of ΔEGT versus ΔN2 should, for healthy operation, be constant (e.g., about 60 degrees). That is, the baseline plot can show data conforming to this constant slope. In various cases, any ΔEGT versus ΔN2 measurements that lie outside this particular constant slope can be considered anomalous and, in some cases, indicative of rubbing. For instance, the abnormal behavior 802 is circled on the graph 800a since the circled data points create a slope different from the constant slope indicative of healthy operation (e.g., the slope of the teal data points is much lower than 60 degrees). As explained above, since different rubs can manifest themselves in different ways, different changes between the plot 800a and a baseline plot of ΔEGT versus ΔN2 can correspond to different types, severities, and/or locations of different rubs in the fielded engine 104. In various aspects, the operation parameter component 702 can employ a trained machine learning pattern recognition algorithm (e.g., trained on plots of ΔEGT versus ΔN2 for engines with confirmed/known rubs) to determine these changes and correlate them with particular rubs.

FIG. 8B depicts an exemplary graph 800b of discharge pressure (PS3, which can stand for "pressure after stage 3 blades") as a function of core vibration (N2 Vibe). The units can be any suitable units (e.g., Pa, psi, bar, mm Hg for pressure; mm, μm, and so on for N2 Vibe). As shown, different colors on the graph 800b can correspond to different engine serial numbers (e.g., different makes/models of the fielded engine 104, and/or different iterations of one make/model of the fielded engine 104, and so on). In various embodiments, during actual operation of the fielded engine 104, the discharge pressure of the fielded engine 104 can be tracked and plotted against the core vibration of the fielded engine 104. The plot can then be compared to a baseline plot (e.g., not shown in FIG. 8B) of discharge pressure versus core vibration that corresponds to proper/healthy operation of the fielded engine 104. In various embodiments, the data points representing PS3 versus N2 Vibe should lie on some characteristic curve associated with proper operation of the fielded engine 104. That is, the baseline plot can show the characteristic curve associated with proper operation. In the example shown in FIG. 8B, most of the data points in FIG. 8B lie on the characteristic curve, while the circled data points lie outside the cure and thus represent abnormal behavior 804. This can, in some cases, be indicative of rubbing. As explained above, since different rubs can manifest themselves in different ways, different changes between the plot 800b and a baseline plot of PS3 versus N2 Vibe can correspond to different types, severities, and/or locations of different rubs in the fielded engine 104. In various aspects, the operation parameter component 702 can employ a trained machine learning pattern recognition algorithm (e.g., trained on plots of PS3 versus N2 Vibe for engines with confirmed/known rubs) to determine these changes and correlate them with particular rubs.

In various embodiments, each of the mode placement component 402, the vibration spectrum component 502, and the operation parameter component 702 can output one or more values (e.g., scalars, vectors, arrays, continuous values, discrete values, and so on) quantifying the results of their respective comparisons/analyses. In some embodiments, the mode placement component 402 can perform a first comparison between fundamental mode placements of the fielded engine 104 (e.g., derived from the fielded engine data 110) and baseline fundamental mode placements (e.g., baseline mode placements 306). The mode placement component 402 can generate one or more first values via a first machine learning algorithm that is trained to recognize patterns/signatures in this first comparison, where the patterns/signatures are indicative of particular types, severities, and/or locations of rubbing (e.g., no rubbing, light axial rubbing of rotor 1, heavy radial rubbing of rotor 2, blade loss of rotor 3, and so on). In various aspects, the first values can quantify the likelihood, type, severity, and/or location of a rub in the fielded engine 104 as detected/predicted by the mode placement component 402. In some embodiments, the vibration spectrum component 502 can perform a second comparison between one or more vibration spectrums of the fielded engine 104 (e.g., derived from the fielded engine data 110) and one or more baseline vibration spectrums (e.g., baseline vibration spectrums 308). The vibration spectrum component 502 can generate one or more second values via a second machine learning algorithm that is trained to recognize patterns/signatures in this second comparison, where the patterns/signatures are indicative of particular types, severities, and/or locations of rubbing (e.g., no rubbing, light combination rubbing of rotor 1, heavy axial rubbing of rotor 2, blade loss of rotor 3, and so on). In various aspects, the second values can quantify the likelihood, type, severity, and/or location of a rub in the fielded engine 104 as detected/predicted by the vibration spectrum component 502. In some embodiments, the operation parameter component 702 can perform a third comparison between real-time operation parameters of the fielded engine 104 (e.g., derived from the fielded engine data 110) and baseline operation parameters (e.g., baseline operation parameters 310). The operation parameter component 702 can generate one or more third values via a third machine learning algorithm that is trained to recognize patterns/signatures in this third comparison, where the patterns/signatures are indicative of particular types, severities, and/or locations of rubbing (e.g., no rubbing, light radial rubbing of rotor 1, heavy combination rubbing of rotor 2, blade loss of rotor 3, and so on). In various aspects, the third values can quantify the likelihood, type, severity, and/or location of a rub in the fielded engine 104 as detected/predicted by the operation parameter component 702.

In various cases, the analysis component 112 can statistically combine (e.g., via a weighted average, and/or via any other statistical technique) the one or more first, second, and third values to yield a rub indicator (e.g., core rub indicator 120). In various aspects, the same weight can be assigned to the first, second, and third values. For example, the mode placement component 402 can indicate that there is a light radial rub of rotor 2, and the vibration spectrum component 502 and the operation parameter component 702 can indicate that there is no rubbing of rotor 2. In such case, computing the rub indicator via an average of the first, second, and third values cause the rub indicator to be slightly higher than it would be had all three analyses indicated no rubbing, but still low enough to indicate that there is a very low likelihood of rubbing of rotor 2 overall. As another aspect, different weights can be assigned to the first, second, and third values. In the previous example, although only one of the three analyses indicated the presence of any rubbing, a heavier weight assigned to the mode placement component 402 can result in the weighted average (e.g., the rub indicator) being high enough to indicate an appreciable likelihood of light radial rubbing of rotor 2. In various cases, different suitable weights can be chosen by those having ordinary skill in the art.

In various instances, just as the core rub indicator 120 can in some embodiments be a continuous and/or discrete scalar and in other embodiments be a vector or matrix (e.g., where some elements of the vector or matrix can represent likelihood of rub, other elements can represent type of rub, other elements can represent severity of rub, and still other elements can represent location of rub), the one or more first values, the one or more second values, and/or the one or more third values can be continuous and/or discrete scalars, vectors, matrices, and so on.

In various embodiments, the rub indicator generated by the analysis component 112 can be analyzed in order to detect and/or predict types, severities, and/or locations of rubs in the fielded engine 104, as described below.

Figure 9A:
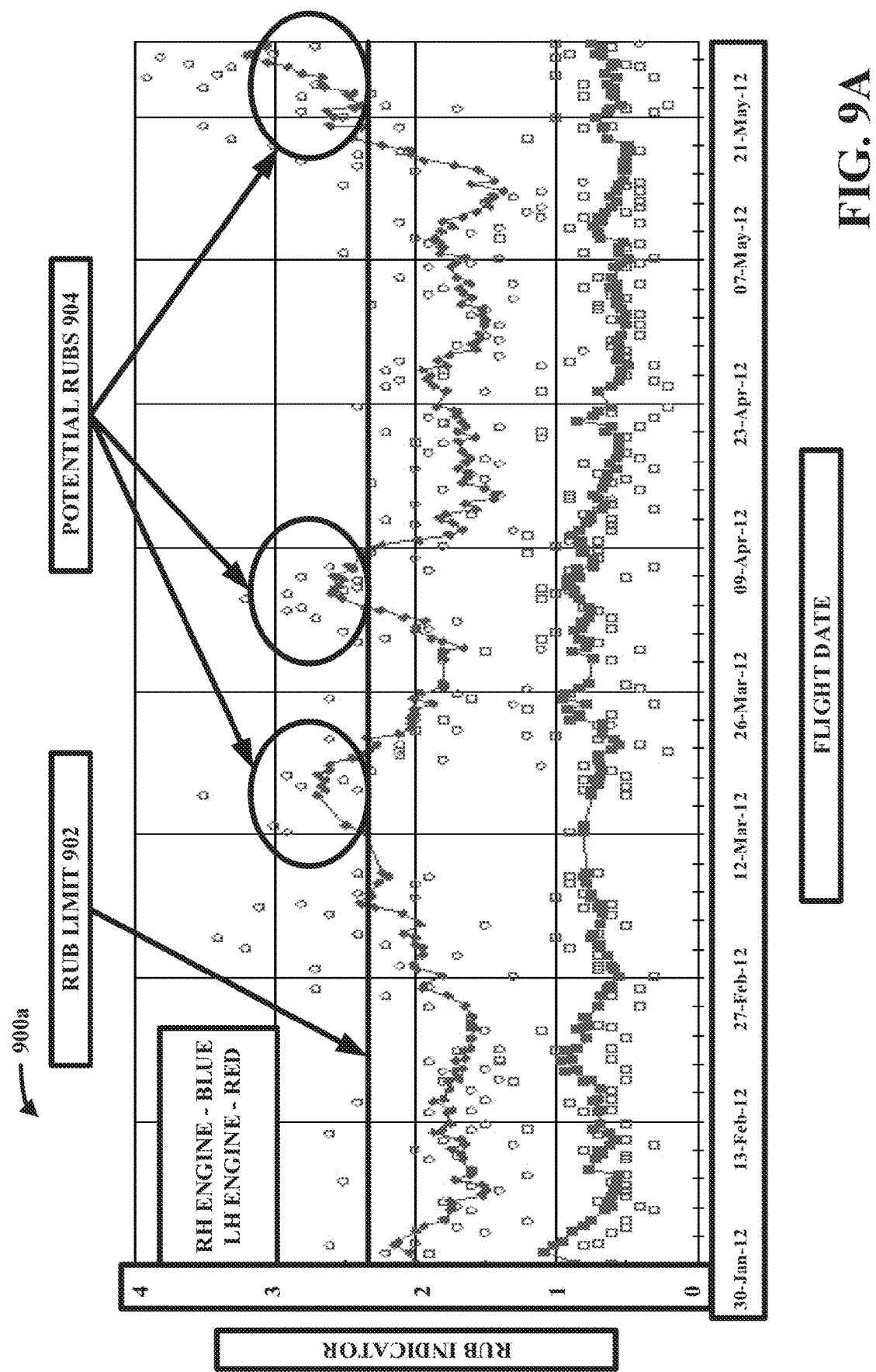
FIGS. 9A-C illustrate exemplary color graphs that demonstrate rub indicator analysis in accordance with one or more embodiments described herein.
Figure 9B:
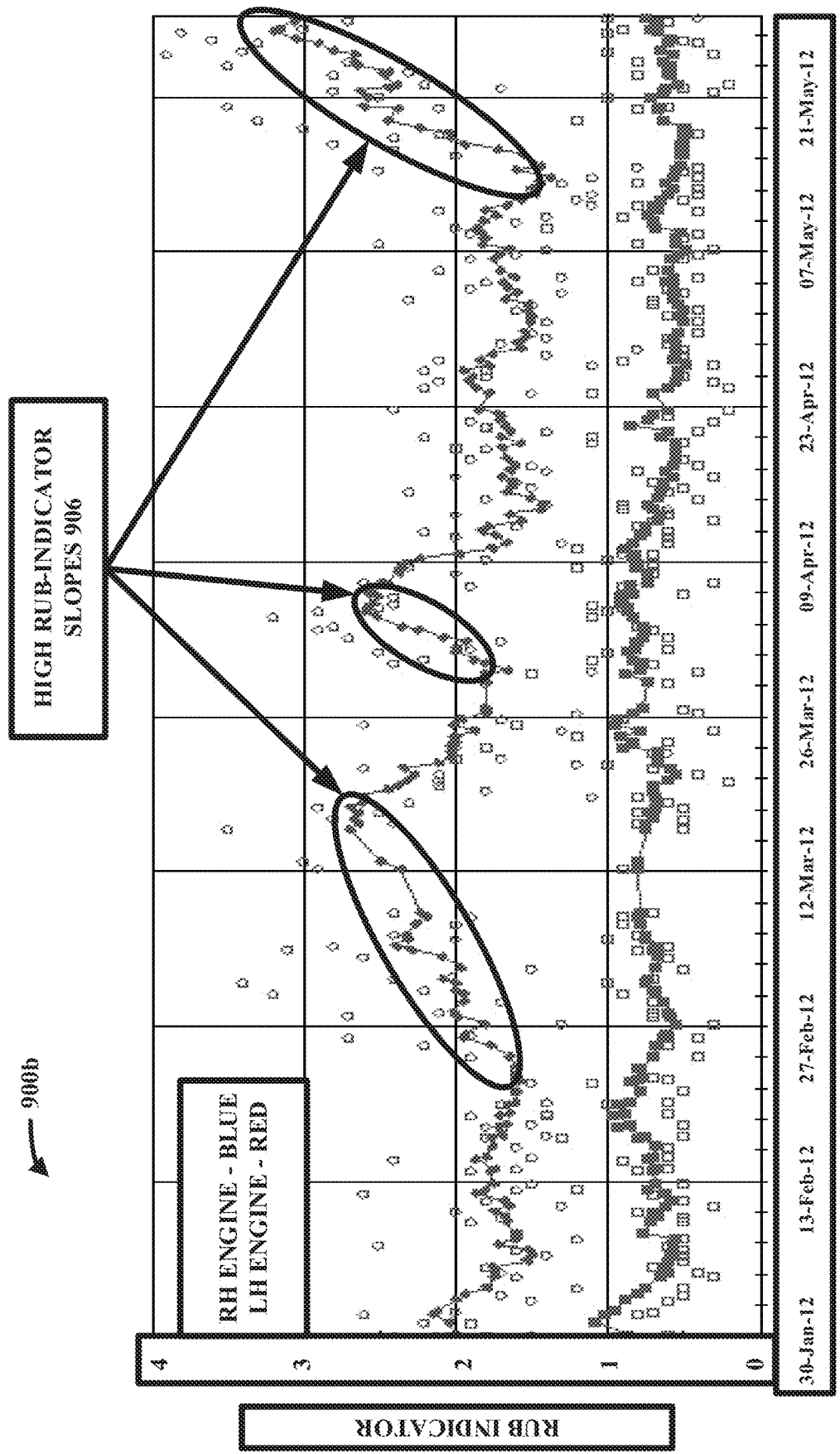
Figure 9C:
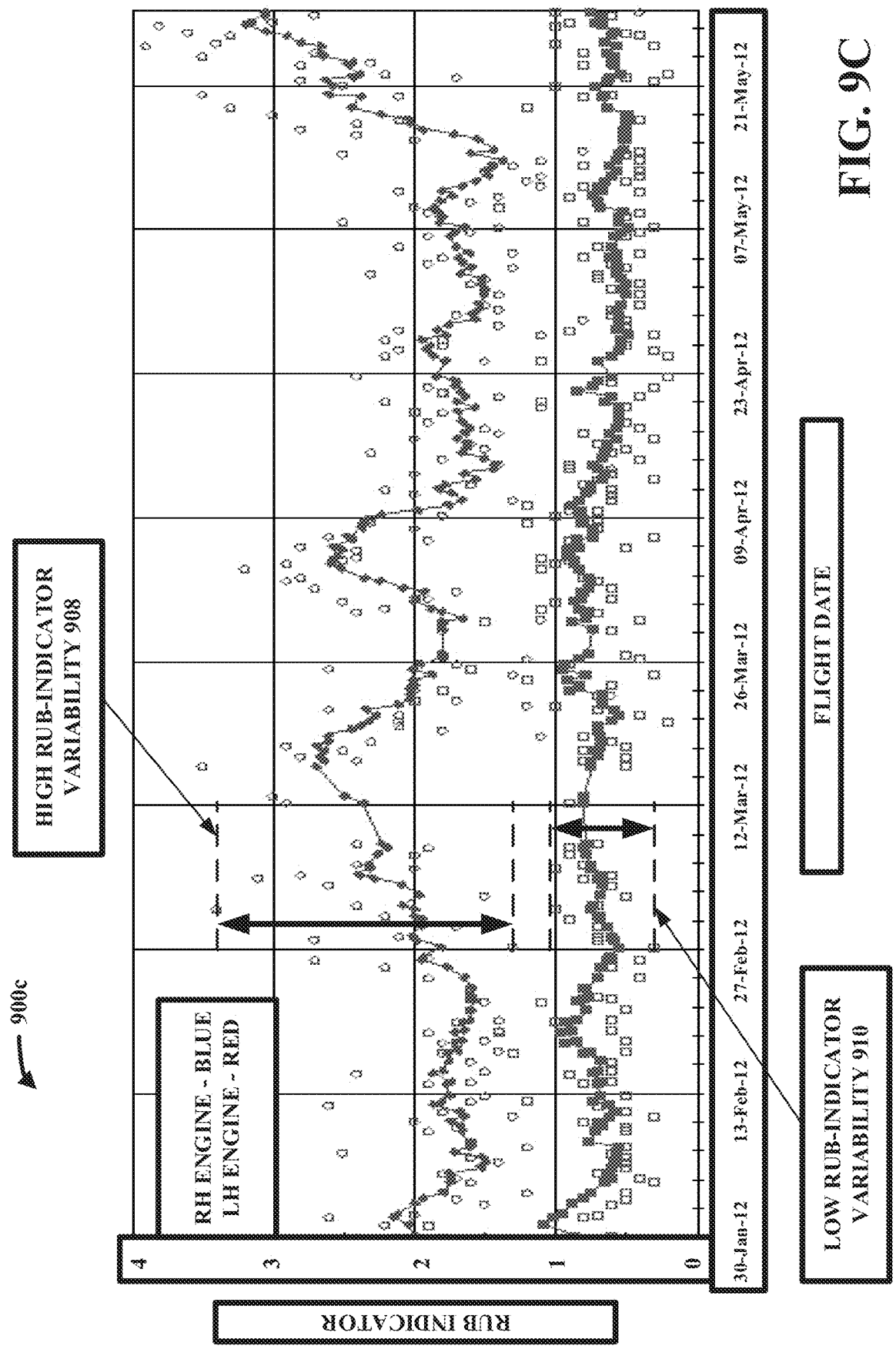

FIGS. 9A-C illustrate exemplary graphs that demonstrate rub indicator analysis (e.g., threshold analysis, slope analysis, variability analysis, and so on) in accordance with one or more embodiments described herein. The values illustrated in FIGS. 9A-C are exemplary only.

FIG. 9A depicts an exemplary graph 900a that illustrates a plot of rub indicator (e.g., core rub indicator 120) over time (e.g., flight date). As shown, the red data points correspond to a left-hand engine of an aircraft, and the blue data points correspond to a right-hand engine of the aircraft. In some instances, the rub indicator can be a continuous and/or discrete scalar, in which case plotting against time is straightforward. In some instances, the rub indicator can be a vector or matrix, in which case any of the elements of the vector or matrix (and/or some other value derived from the elements of the vector or matrix, such as Euclidean distance, determinant, and so on) can be plotted against time. For instance, if the rub indicator is a vector where one element indicates a likelihood of rubbing, that element can be plotted against time to obtain the graph 900a. In various embodiments, the magnitude of the rub indicator (or the element of the rub indicator that is plotted in graph 900a, which will be referred to here as the rub indicator for sake of brevity) can be compared to a rub limit 902. In some embodiments, the rub limit 902 can be a threshold above which a rub is deemed to be present (e.g., detected) and below which a rub is deemed to not yet be present (e.g., not detected). In such embodiments, a rub can be detected if the rub indicator exceeds the rub limit 902. In some embodiments, the rub limit 902 can be a threshold above which a rub is deemed plausible and/or imminent (e.g., predicted) and below which a rub is deemed not plausible and/or imminent (e.g., not predicted). In such embodiments, a rub can be predicted as imminent and/or likely to soon occur if the rub indicator exceeds the rub limit 902. As shown in graph 900a, the potential rubs 904 are those rub indicator readings for the right-hand engine (blue) that surpassed the rub limit 902. Such data points can indicate that a rub has been detected and/or predicted, as the case may be, for the right-hand engine on the corresponding flight dates. As shown, the rub indicator readings for the left-hand indicator (red) do not exceed the rub limit 902. Thus, no rub is detected or predicted, as the case may be, for the left-hand engine. In various cases, the rub limit 902 can be derived from development engines and/or fielded engine legacy data (e.g., based on rub indicators from engines that had known rubs, as confirmed in borescope inspections). In various aspects, the rub indicator can be monitored in real-time to determine if it has exceeded the rub limit 902. In various instances, the rub indicator as plotted over time can be monitored after one or more operational segments of the relevant engine (e.g., during servicing/maintenance, after a long trip, and so on).

FIG. 9B depicts another exemplary graph 900b that illustrates a plot of rub indicator (e.g., core rub indicator 120) over time (e.g., flight date). In various embodiments, the plotted rub indicator can represent a likelihood of rubbing and the slope of the rub indicator (e.g., slope of a trend line associated with the rub indicator, slope of scatter plot segments associated with the rub indicator, and so on) with respect to time can be compared to a threshold slope in order to predict rubs. That is, if the rub indicator's slope for a given time period exceeds the slope threshold, a rub can be predicted to occur. In various embodiments, the magnitude of the rub indicator slope can correspond to a confidence in the prediction (e.g., a very steep slope can result in a stronger prediction of potentially imminent rubbing than can a very gentle slope). In various embodiments, a remaining time until the predicted rub materializes can be estimated based on the current slope of the rub indicator and the current magnitude of the rub indicator (e.g., rub can occur when the quantity obtained by taking the current slope of the rub indicator (known), multiplying by the remaining time (unknown), and adding to the current rub indicator magnitude (known) exceeds the rub limit 902 (known)). As shown in graph 900b, the high rub-indicator slopes 906 are those rub indicator readings for the right-hand engine (blue) that exhibit a sufficiently steep slope. Such data points can indicate that a rub had been predicted for the right-hand engine at the corresponding flight dates. As shown, the rub indicator readings for the left-hand engine (red) do not exhibit any slopes as steep as the high rub-indicator slopes 906. Thus, no rub is predicted for the left-hand engine. In various cases, the slope threshold can be derived from development engines and/or fielded engine legacy data (e.g., based on rub indicators from engines that had known rubs, as confirmed in borescope inspections). In various aspects, the rub indicator can be monitored in real-time to determine if it has exceeded the slope threshold. In various instances, the rub indicator as plotted over time can be monitored after one or more operational segments of the relevant engine (e.g., during servicing/maintenance, after a long trip, and so on).

FIG. 9C depicts another exemplary graph 900c that illustrates a plot of rub indicator (e.g., core rub indicator 120) over time (e.g., flight date). In various embodiments, the plotted rub indicator can represent a likelihood of rubbing and the variability of the rub indicator (e.g., difference between a highest and lowest rub indicator reading in a given time interval, standard deviation and/or variance of all rub indicator readings in a given time interval, and so on) can be compared to a threshold variability in order to predict rubs. That is, if the rub indicator's variability for a given time period exceeds the variability threshold, a rub can be predicted to occur. In various embodiments, the magnitude of the rub indicator variability can correspond to a confidence in the prediction (e.g., a very large difference/variability can result in a stronger prediction of potentially imminent rubbing than can a very narrow variability). As shown in graph 900c, the high rub-indicator variability 908 represents those rub indicator readings for the right-hand engine (blue) for which the difference between the highest rub indicator reading in a given time interval (e.g., in the two-week period from 27 Feb. 2012 to 12 Mar. 2012) and the lowest rub indicator reading in the given time interval exceeds the variability threshold. Such data points can indicate that a rub has been predicted for the right-hand engine. As shown, the rub indicator readings for the left-hand engine (red) do not exhibit any variability as the high as those for the right-hand engine. Indeed, the left-hand engine exhibits a low rub-indicator variability 910 for the two-week interval from 27 Feb. 2012 to 12 Mar. 2012. Thus, no rub is predicted for the left-hand engine. In various cases, the variability threshold can be derived from development engines and/or fielded engine legacy data (e.g., based on rub indicators from engines that had known rubs, as confirmed in borescope inspections). In various aspects, the rub indicator can be monitored in real-time to determine if it has exceeded the variability threshold. In various instances, the rub indicator as plotted over time can be monitored after one or more operational segments of the relevant engine (e.g., during servicing/maintenance, after a long trip, and so on).

In various embodiments, one or more of graphs 900a, 900b, and/or 900c can be generated and/or analyzed by the classification component 122 to determine and/or predict engine rubs. In various cases, the classification component 122 can utilize a machine learning classification algorithm (e.g., Random Forest) to detect and/or predict rubs based on the rub indicator.

In various embodiments, when a rub and/or potential rub is detected and/or predicted as described above, the subject claimed innovation can perform a fuller and/or enhanced analysis of some and/or all of the fielded engine data 110 (e.g., continuous engine operation data CEOD)) in order to confirm such detected and/or predicted rubs. In various cases, a call for borescope inspection can be made after such full CEOD analysis. The borescope inspection findings can be used for engine health estimation, adding the engine to an airline's watchlist, improving performance retention (e.g., scheduling high pressure turbine active clearance control maintenance), and enhancing shop visit planning.

Figure 10:
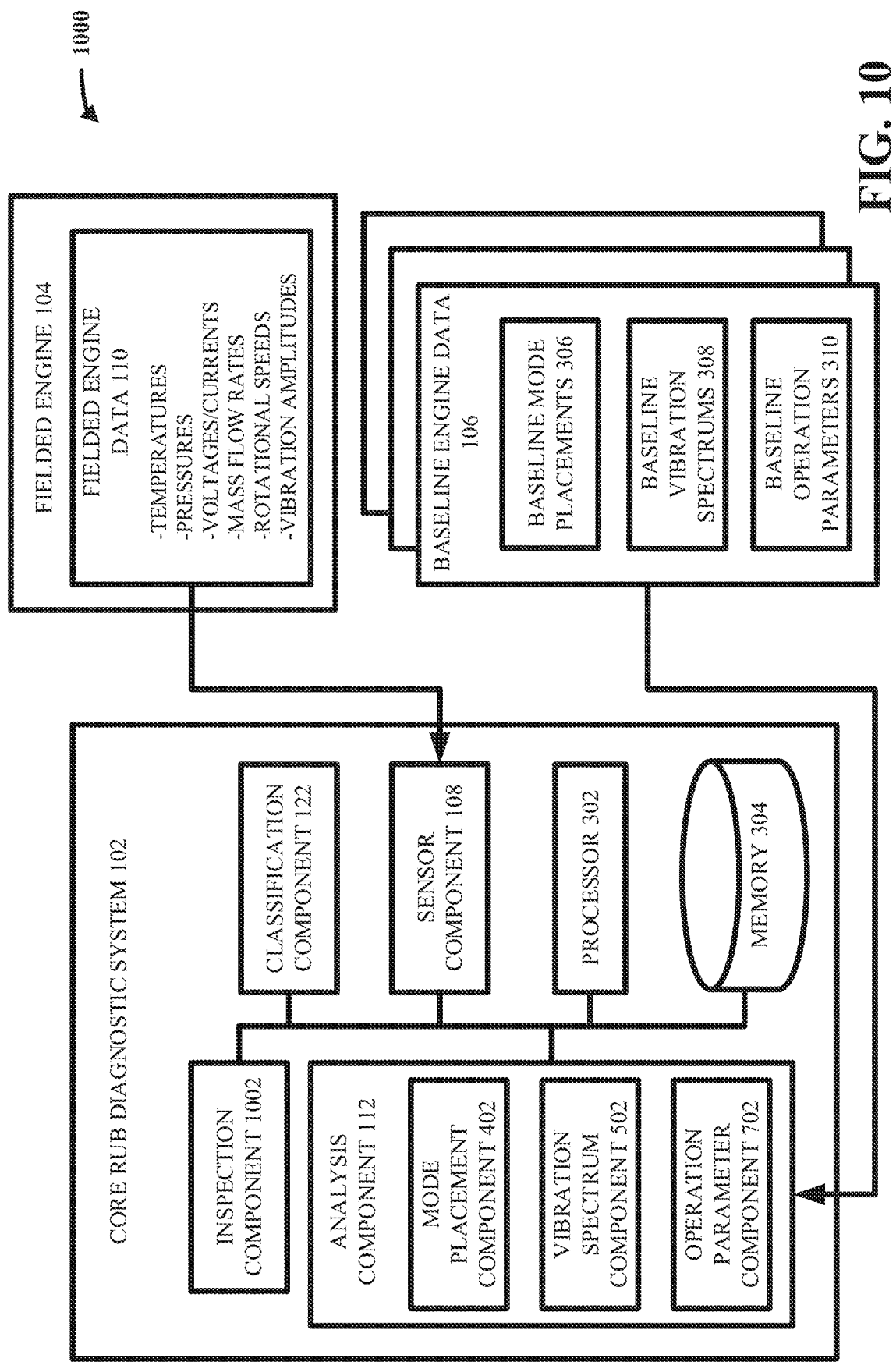
FIG. 10 illustrates a block diagram of an example, non-limiting system including an inspection component that facilitates predictive core rub diagnostics in accordance with one or more embodiments described herein.

FIG. 10 illustrates a block diagram of an example, non-limiting system 1000 including an inspection component that can facilitate predictive core rub diagnostics in accordance with one or more embodiments described herein. As shown, the system 100 can, in various embodiments, comprise the same components as the system 700, and can further comprise an inspection component 1002.

In one or more embodiments, the inspection component 1002 can request a borescope inspection for the fielded engine 104 based on the rub indicator (e.g., core rub indicator 120) and/or the rub classification report generated by the classification component 122. For example, if a rub is detected and/or predicted, a borescope inspection can be automatically requested and/or scheduled by the inspection component 1002. In various embodiments, the inspection component 1002 can request and/or schedule, based on the rub indicator and/or the rub classification report, any other type of suitable service and/or maintenance. In some instances, the inspection component 1002 can short-list the fielded engine 104 for a potential borescope inspection and/or for any other type of service and/or maintenance.

Figure 11A:
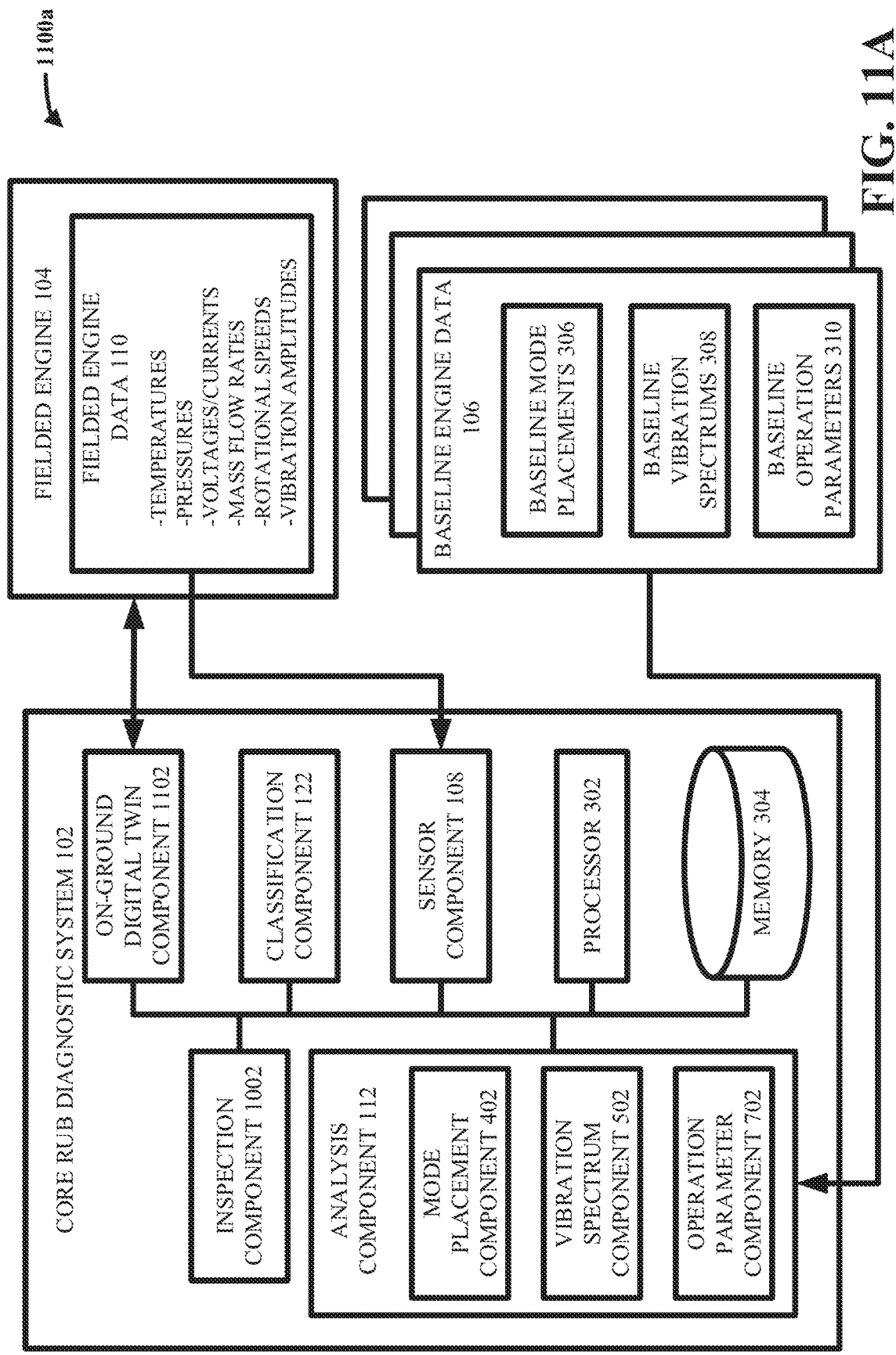
FIGS. 11A-B illustrate block diagrams of example, non-limiting systems including an on-ground digital twin component that facilitates predictive core rub diagnostics in an engine fleet in accordance with one or more embodiments described herein.
Figure 11B:
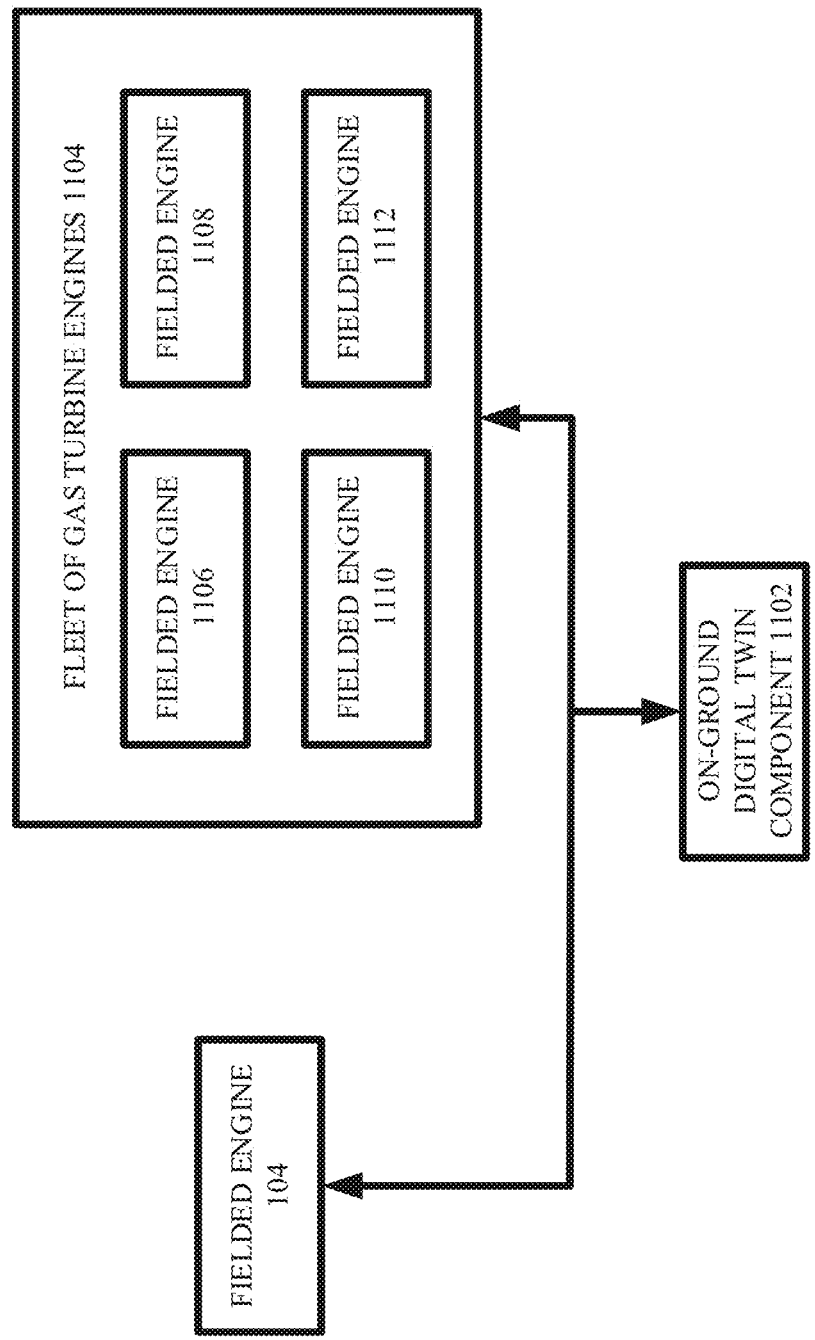

FIGS. 11A-B illustrate block diagrams of example, non-limiting systems 1100a and 1100b including an on-ground digital twin component that can facilitate predictive core rub diagnostics in an engine fleet in accordance with one or more embodiments described herein. As shown, the system 1100a can, in various embodiments, comprise the same components as the system 1000, and can further comprise an on-ground digital twin component 1102.

In one or more embodiments, the on-ground digital twin component 1102 can monitor performance of the fielded engine 104 (e.g., monitoring the rub indicator, rub classification report, and/or fielded engine data 110, and so on). In various embodiments, the on-ground digital twin component 1102 can recommend corrective, preventative, and/or ameliorative actions to the fielded engine 104 (e.g., to the FADEC logic controlling the fielded engine 104) and/or to human operators of the fielded engine 104, based on the rub indicator, rub classification report, and/or fielded engine data 110, and so on. In various aspects, the on-ground digital twin component 1102 can advise against certain actions deemed to be damaging, destructive, and/or suboptimal based on the rub indicator, rub classification report, and/or fielded engine data 110, and so on. A digital twin can be a digital model/representation of a physical entity (e.g., Internet of Things device, and so on) that is subject to the dynamics of the physical entity (e.g., the digital twin can react to stimuli in the same, substantially same, and/or approximately same way as the physical entity would react to the stimuli). A digital twin can allow for potential actions and/or operations of the physical entity to be digitally simulated prior to actual implementation, which can allow for effective cost-benefit analyses of the potential actions/operations and thus for better entity management. In various embodiments, the on-ground digital twin component 1102 can create a digital twin of the fielded engine 104. For example, the on-ground digital twin component 1102 can generate an analytic and/or computational model of the fielded engine 104, such that the model emulates the thermodynamic, fluid dynamic, aerodynamic, structural, and/or vibrational characteristics of the fielded engine 104 (e.g., via finite element analysis (FEA), computational fluid dynamics (CFD), and so on). In some aspects, the on-ground digital twin component 1102 can continuously, continually, periodically, and/or aperiodically update the digital twin of the fielded engine 104 (e.g., sending the rub indicator and/or rub classification report to the digital twin). For example, if the rub indicator and/or rub classification report detects/predicts a particular type, severity, and/or location of rub in the fielded engine 104, the on-ground digital twin component 1102 can update the digital twin of the fielded engine 104 to include the detected/predicted type, severity, and/or location of rub. Then, digital simulations of the fielded engine 104 performed on the digital twin can take into account the detected/predicted rub and make appropriate recommendations accordingly.

In various embodiments, the on-ground digital twin component 1102 can update the digital twin of the fielded engine 104 based on results from borescope inspections and/or other servicing/maintenance, such as those requested by the inspection component 1002. In such cases, the presence of detected/predicted rubs can be confirmed and/or denied by the borescope inspection, servicing, and/or maintenance, and the digital twin can be updated based on whether the detection/prediction of the core rub diagnostic system 102 was correct. If the detection/prediction was correct, the digital twin can be updated to indicate that the machine learning algorithms of the core rub diagnostic system 102 (e.g., the pattern recognition algorithms employed by the mode placement component 402, the vibration spectrum component 502, and/or the operation parameter component 702) are functioning appropriately. If the detection/prediction was incorrect, the digital twin can be updated to indicate that at least one of the machine learning algorithms of the core rub diagnostic system 102 requires additional training and/or correction (e.g., manual and/or automated adjustment to neural network weights, and so on). In such cases, the on-ground digital twin component 1102 can employ a self-learning algorithm that improves the digital twin based on the rub indicator, the rub classification report, and/or confirmations or denials of the presence of detected/predicted rubs. In various embodiments, any suitable self-learning algorithm can be employed. For example, if the rub indicator and/or rub classification report detects/predicts the presence of a light combination rub of rotor 2 in the fielded engine 104, but a subsequent borescope inspection denies this detection/prediction and instead finds a moderate radial rub of rotor 2, the on-ground digital twin component 1102 can update the digital twin accordingly and can cause a recalibration of the analysis component 112. In such recalibration, an automated and/or manual adjustment of one or more of the machine learning algorithms employed by the analysis component 112 can be performed such that the patterns/signatures observed by the analysis component 112 in the mode placement, vibration signature, and operation parameter comparisons are correlated to a moderate radial rub of rotor 2 and are no longer correlated with a light combination rub of rotor 2.

FIG. 11B depicts one or more embodiments of the subject claimed innovation where the on-ground digital twin component 1102 can be communicatively coupled to a fleet of gas turbine engines 1104 as well as to the fielded engine 104. As shown, the fleet of gas turbine engines 1104 can comprise one or more other fielded engines (e.g., 1106, 1108, 1110, 1112, and so on). Although only four other fielded engines are depicted, any number of other fielded engines can be in the fleet of gas turbine engines 1104 in various embodiments. In various aspects, the fielded engine 104 can be considered part of the fleet of gas turbine engines 1104. In various instances, the on-ground digital twin component 1102 can track emerging trends in the fleet of gas turbine engines 1104 (e.g., tracking one or more other rub indicators and/or rub classification reports from the fleet of gas turbine engines 1104). For example, in various instances, the digital twin can be a global digital twin that represents not just the single fielded engine 104, but also all other engines of the same make/model as the fielded engine 104 that are in the fleet of gas turbine engines 1104. In various aspects, the on-ground digital twin component 1102 can update the global digital twin based on the monitored rub indicators and/or rub classification reports from each of the other engines in the fleet of gas turbine engines 1104 and from the rub indicators and/or rub classification reports from the fielded engine 104. Such a global digital twin can, in various instances, essentially allow for each engine in the fleet of gas turbine engines 1104 to learn from the mistakes of other engines in the fleet of gas turbine engines 1104. For instance, as explained above, if a detected/predicted rub in the fielded engine 104 is denied by a subsequent borescope inspection, the on-ground digital twin component 1102 can cause a recalibration/update of the analysis component 112 based on the denial. In such case where a global digital twin is employed, the same/similar corrective recalibration/update can be simultaneously scheduled and/or performed for all the engines in the fleet of gas turbine engines 1104 (e.g., such that the entire fleet learned from the mistake of a single engine). Similarly, if a detected/predicted rub of one of the engines in the fleet of gas turbine engines 1104 is proven incorrect by a subsequent borescope inspection, the analysis component 112 corresponding to the fielded engine 104 can be updated/recalibrated accordingly. In various embodiments, the on-ground digital twin component 1102 can perform proactive work-scope identification for the fleet of gas turbine engines 1104 prior to scheduled maintenance, repair, and/or overhaul visits. That is, the on-ground digital twin component 1102 can, in various embodiments, monitor the entire fleet of gas turbine engines 1104 and can request and/or perform servicing and maintenance as needed. In various embodiments, the on-ground digital twin component 1102 can monitor the rub indicators from the fielded engine 104 and the fleet of gas turbine engines 1104 in search of emerging trends (e.g., trends in the plots of rub indicator over time for each of the engines in the fleet). The recommendations of the on-ground digital twin component 1102 can be based, in various embodiments, on these emerging trends. For example, if the rub indicator and/or rub classification report of the fielded engine 104 exhibited a particular pattern (e.g., magnitude pattern, slope pattern, variability pattern, and so on as in the graphs 900a, 900b, and/or 900c) before the presence of a particular type, severity, and/or location of rub was confirmed, then the on-ground digital twin component 1102 can search for such patterns in the rub indicators and/or rub classification reports of the engines in the fleet of gas turbine engines 1104 in order to preemptively detect, predict, and/or prevent the same type, severity, and/or location of rub in the fleet.

Figure 12:
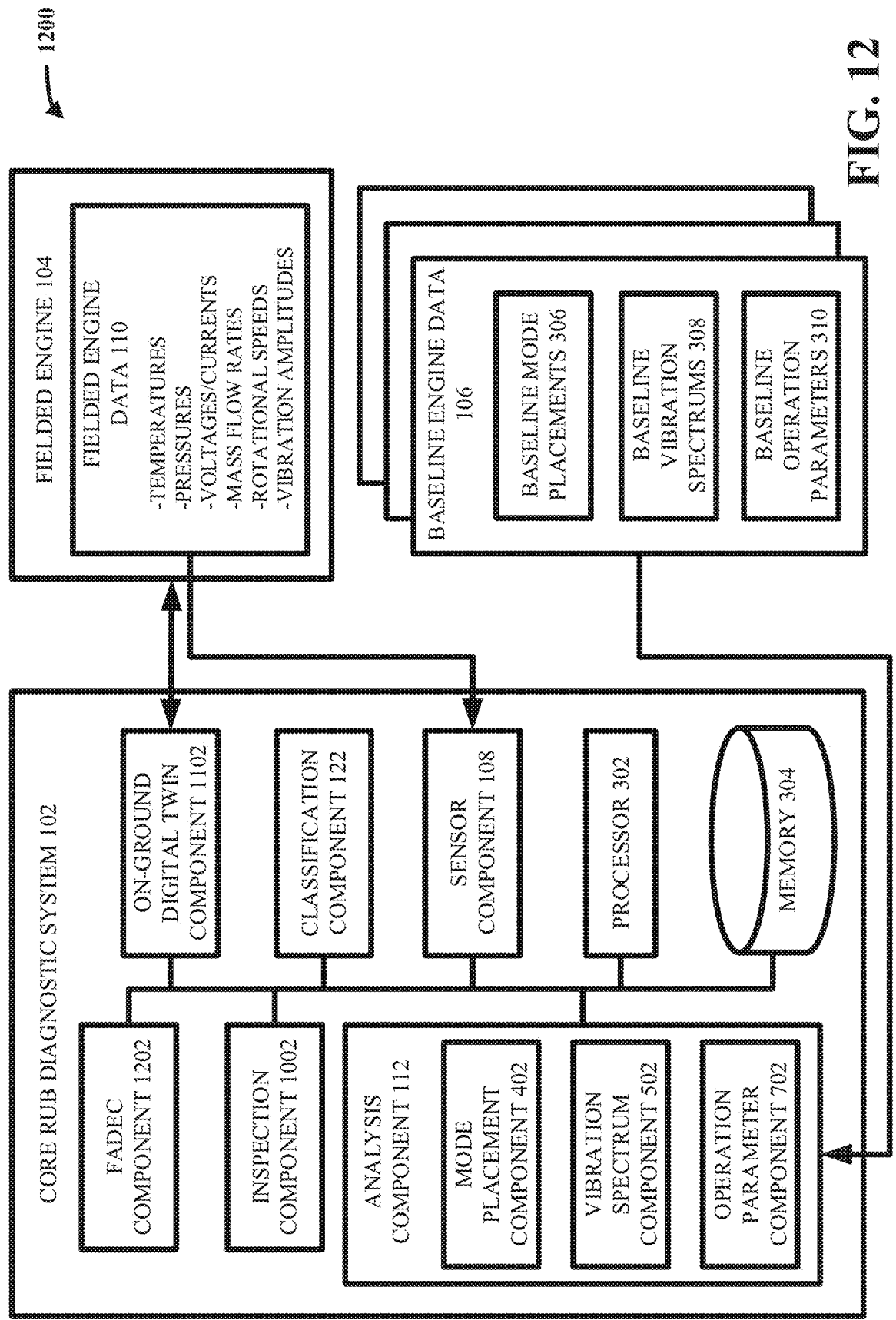
FIG. 12 illustrates a block diagram of an example, non-limiting system including a FADEC component that facilitates predictive core rub diagnostics in accordance with one or more embodiments described herein.

FIG. 12 illustrates a block diagram of an example, non-limiting system 1200 including a FADEC component that can facilitate predictive core rub diagnostics in accordance with one or more embodiments described herein. As shown, the system 1200 can, in various embodiments, comprise the same components as the system 1100, and can further comprise a FADEC component 1202.

In one or more embodiments, the FADEC component 1202 can be a full authority digital engine control logic and/or program that can operate the fielded engine 104. In various aspects, the FADEC component 1202 can generate intended and/or planned actions/operations for the fielded engine 104 (e.g., full throttle acceleration, some other rate of acceleration, maximum deceleration, some other rate of deceleration, stalling, powering down, and so on). In various instances, the FADEC component 1202 can compare and/or rank the rub indicator, rub classification report, and/or results from the digital twin of the fielded engine 104 against the intended/planned actions in order to evaluate the appropriateness of the intended/planned actions. For instance, the FADEC component 1202 can intend to accelerate the fielded engine 104 at a particular rate. However, the rub indicator can identify and/or designate that the fielded engine 104 has a particular type, location, and severity of rub, which rub can make such acceleration risky and/or dangerous (e.g., accelerating at the intended rate can exacerbate the existing rub and/or otherwise cause damage to the fielded engine 104, and so on). In various aspects, the FADEC component 1202 can leverage the rub indicator to determine that the intended rate of acceleration is inappropriate given the detected rub and the extent and/or likelihood of damage that can result if such intended acceleration is implemented with the detected rub. The FADEC component 1202 can then determine a more appropriate course of action given the detected rub (e.g., maintain thrust, decelerate, request landing, and so on). In some instances, the FADEC component 1202 can decide whether or not to implement an intended/planned course of action based on a level of risk and/or level of damage that can result from implementation of such intended/planned action given the detected rub. In various aspects, the FADEC component 1202 can decide whether to implement an intended/planned course of action based on a predicted rub (e.g., based on whether the intended/planned action is likely to cause a not-yet-existing rub to materialize, given the predictions based on the rub indicator and/or rub classification report).

Figure 13:
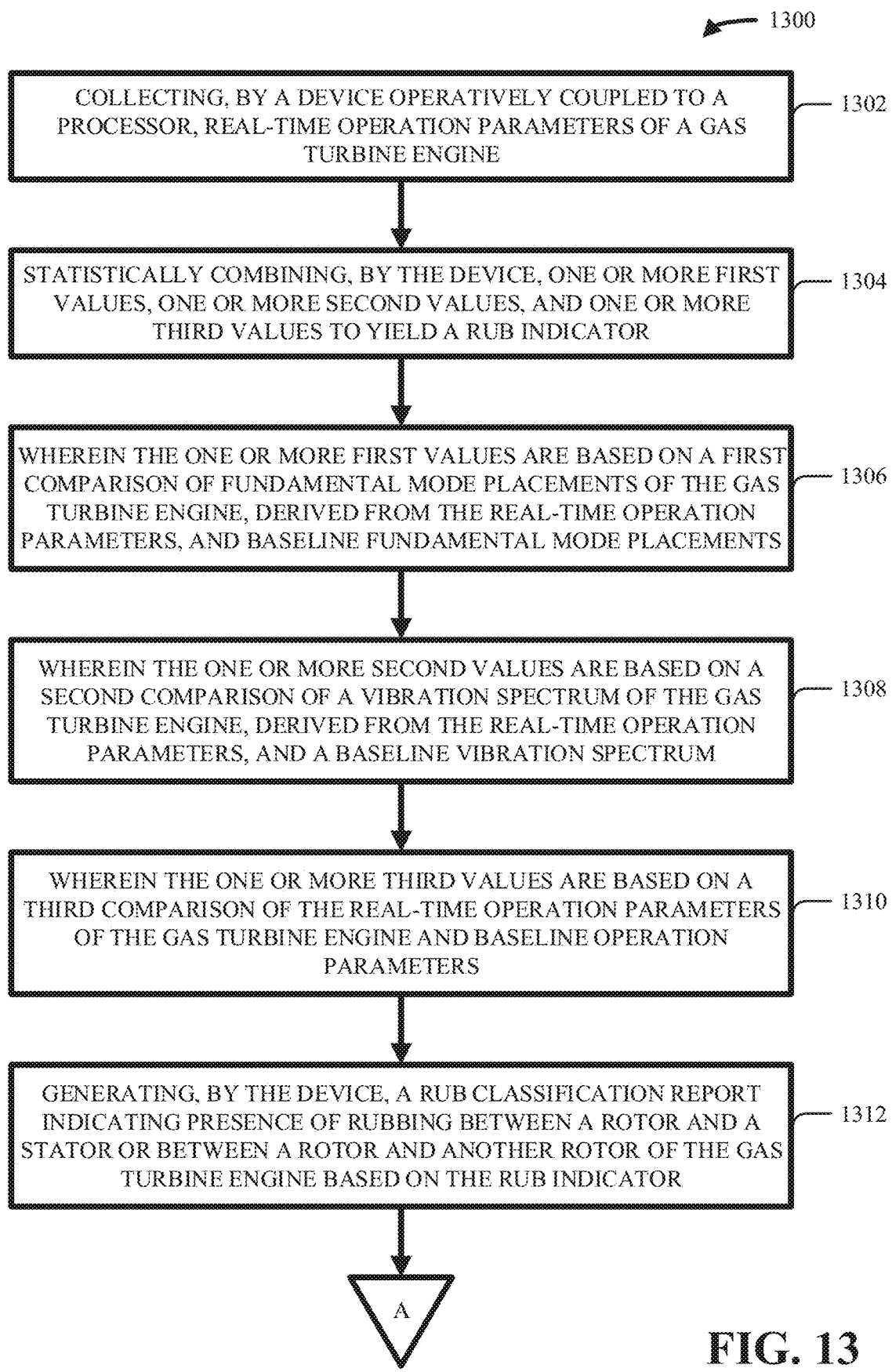
FIG. 13 illustrates a flow diagram of an example, non-limiting computer-implemented method that facilitates predictive core rub diagnostics in accordance with one or more embodiments described herein.

FIG. 13 illustrates a flow diagram of an example, non-limiting computer-implemented method 1300 that can facilitate predictive core rub diagnostics in accordance with one or more embodiments described herein.

In various embodiments, act 1302 can comprise collecting (e.g., via sensor component 108), by a device operatively coupled to a processor, real-time operation parameters (e.g., fielded engine data 110) of a gas turbine engine (e.g., fielded engine 104).

In various instances, act 1304 can comprise statistically combining (e.g., via analysis component 112), by the device, one or more first values (e.g., values generated by mode placement component 402), one or more second values (e.g., values generated by vibration spectrum component 502), and one or more third values (e.g., values generated by operation parameter component 702) to yield a rub indicator (e.g., core rub indicator 120).

In various aspects, act 1306 can comprise wherein the one or more first values are based on a first comparison (e.g., mode placement analysis 114) of fundamental mode placements (e.g., operational natural frequencies) of the gas turbine engine, derived from the real-time operation parameters, and baseline fundamental mode placements (e.g., baseline mode placements 306).

In various embodiments, act 1308 can comprise wherein the one or more second values are based on a second comparison (e.g., blade passing frequency analysis 116) of a vibration spectrum (e.g., FFT signature) of the gas turbine engine, derived from the real-time operation parameters, and a baseline vibration spectrum (e.g., baseline vibration spectrums 308).

In various instances, act 1310 can comprise wherein the one or more third values are based on a third comparison (e.g., operation parameter analysis 118) of the real-time operation parameters of the gas turbine engine and baseline operation parameters (e.g., baseline operation parameters 310).

In various aspects, act 1312 can comprise generating (e.g., via classification component 122), by the device, a rub classification report indicating presence of rubbing between a rotor and a stator or between a rotor and another rotor of the gas turbine engine based on the rub indicator.

Figure 14:
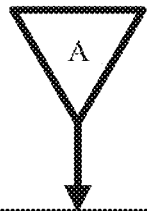
FIG. 14 illustrates a flow diagram of an example, non-limiting computer-implemented method including short listing a borescope request that facilitates predictive core rub diagnostics in accordance with one or more embodiments described herein.

FIG. 14 illustrates a flow diagram of an example, non-limiting computer-implemented method 1400 including short listing a borescope request that can facilitate predictive core rub diagnostics in accordance with one or more embodiments described herein. As shown, the computer-implemented method 1400 can, in various embodiments, comprise the same acts as the computer-implemented method 1300, and can further comprise act 1402.

Act 1402 can comprise short listing (e.g., via inspection component 1002), by the device, the gas turbine engine for a potential borescope inspection, based on the rub classification report.

Figure 15:
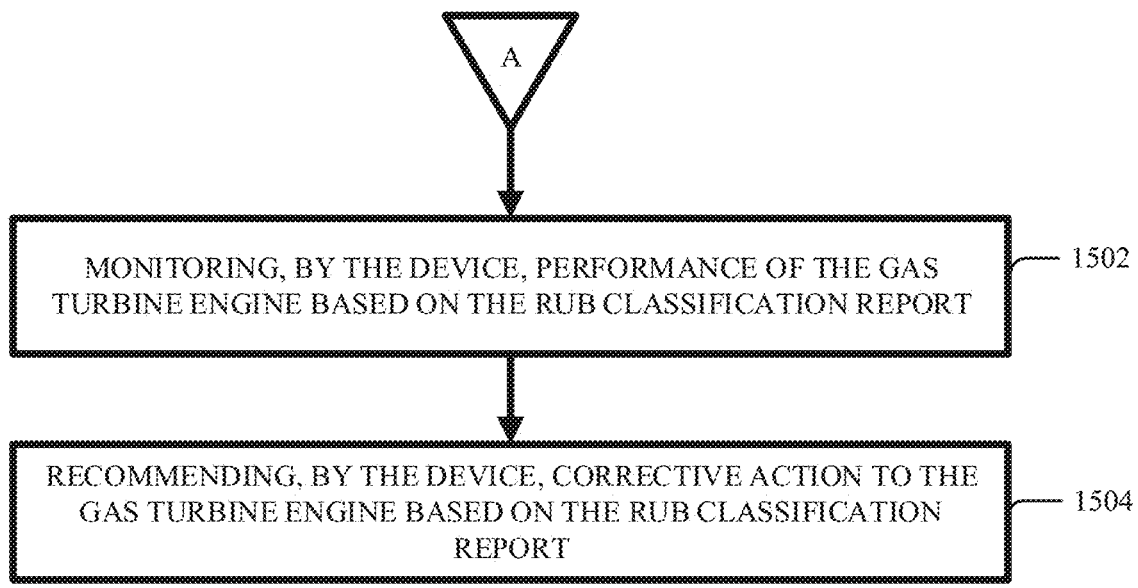
FIG. 15 illustrates a flow diagram of an example, non-limiting computer-implemented method that facilitates predictive core rub diagnostics in accordance with one or more embodiments described herein.

FIG. 15 illustrates a flow diagram of an example, non-limiting computer-implemented method 1500 that can facilitate predictive core rub diagnostics in accordance with one or more embodiments described herein. As shown, the computer-implemented method 1500 can, in various embodiments comprise the same acts as the computer-implemented method 1300, and can further comprise acts 1502 and 1504.

In various instances, act 1502 can comprise monitoring (e.g., via on-ground digital twin component 1102), by the device, performance of the gas turbine engine based on the rub classification report.

In various aspects, act 1504 can comprise recommending (e.g., via on-ground digital twin component 1102), by the device, corrective action to the gas turbine engine based on the rub classification report.

Figure 16:
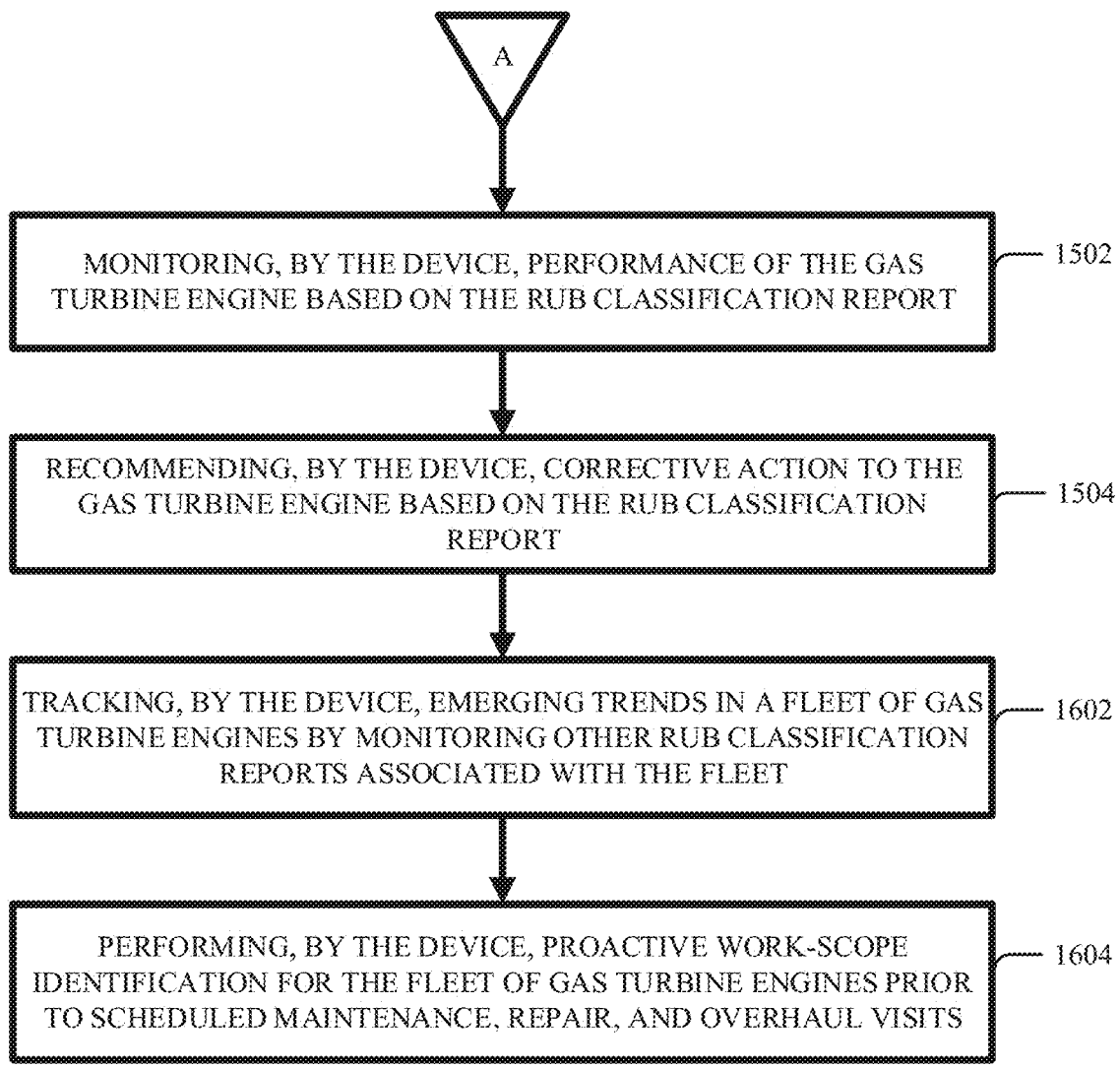
FIG. 16 illustrates a flow diagram of an example, non-limiting computer-implemented method that facilitates predictive core rub diagnostics of an engine fleet in accordance with one or more embodiments described herein.

FIG. 16 illustrates a flow diagram of an example, non-limiting computer-implemented method 1600 that can facilitate predictive core rub diagnostics of an engine fleet in accordance with one or more embodiments described herein. As shown, the computer-implemented method 1600 can, in various embodiments, comprise the same acts as the computer-implemented method 1500, and can further comprise acts 1602 and 1604.

In various instances, act 1602 can comprise tracking (e.g., by on-ground digital twin component 1102), by the device, emerging trends in a fleet of gas turbine engines (e.g., fleet of gas turbine engines 1104) by monitoring other rub classification reports associated with the fleet.

In various aspects, act 1604 can comprise performing (e.g., via on-ground digital twin component 1102), by the device, proactive work-scope identification for the fleet of gas turbine engines prior to scheduled maintenance, repair, and overhaul visits.

Figure 17:
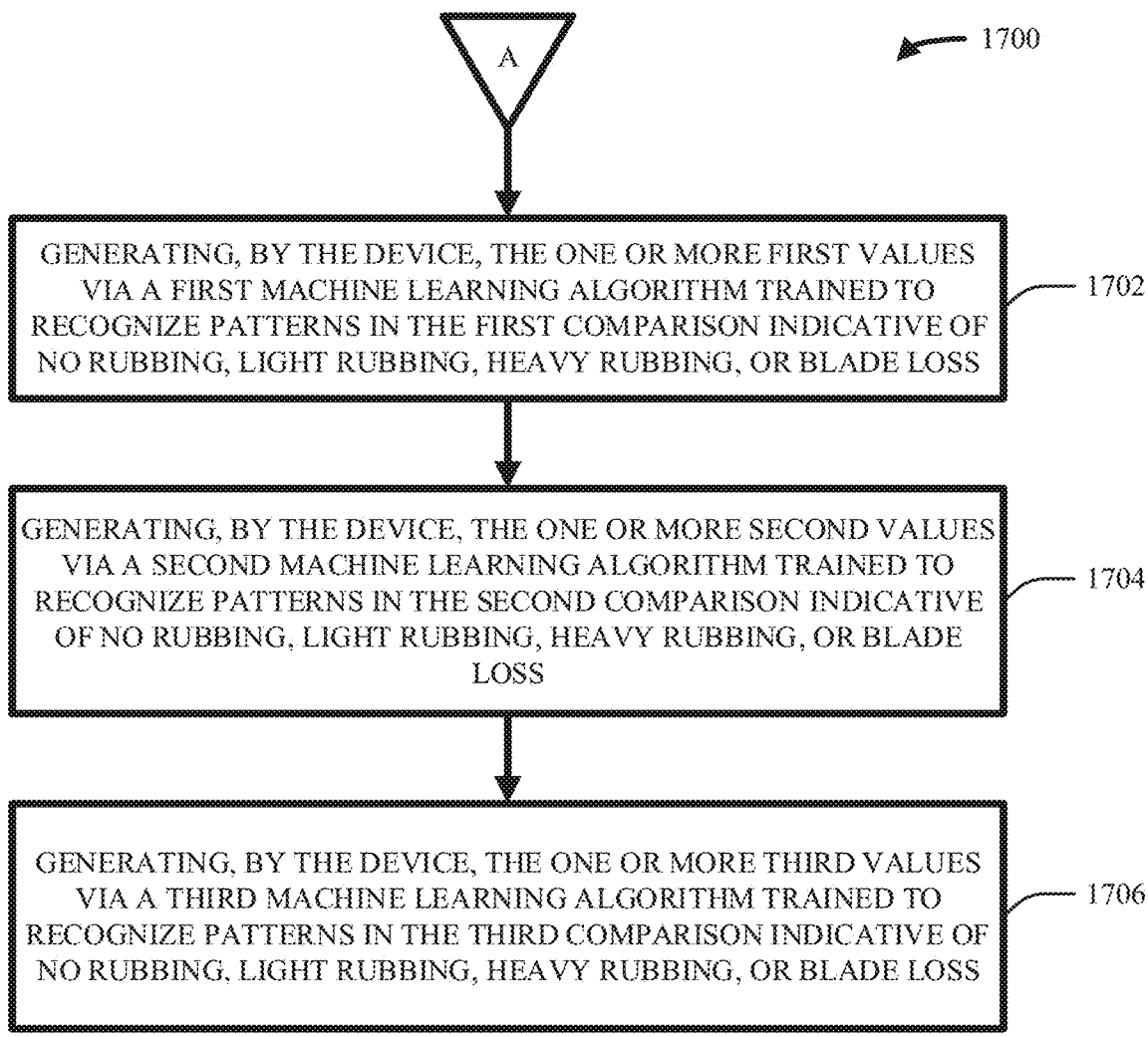
FIG. 17 illustrates a flow diagram of an example, non-limiting computer-implemented method that facilitates predictive core rub diagnostics in accordance with one or more embodiments described herein.

FIG. 17 illustrates a flow diagram of an example, non-limiting computer-implemented method 1700 that can facilitate predictive core rub diagnostics in accordance with one or more embodiments described herein. As shown, the computer-implemented method 1700 can, in various embodiments, comprise the same acts as the computer-implemented method 1300, and can further comprise acts 1702, 1704, and 1706.

In various embodiments, act 1702 can comprise generating (e.g., via mode placement component 402), by the device, the one or more first values via a first machine learning algorithm trained to recognize patterns in the first comparison indicative of no rubbing, light rubbing, heavy rubbing, or blade loss.

In various instances, act 1704 can comprise generating (e.g., via vibration spectrum component 502), by the device, the one or more second values via a second machine learning algorithm trained to recognize patterns in the second comparison indicative of no rubbing, light rubbing, heavy rubbing, or blade loss.

In various aspects, act 1706 can comprise generating (e.g., via operation parameter component 702), by the device, the one or more third values via a third machine learning algorithm trained to recognize patterns in the third comparison indicative of no rubbing, light rubbing, heavy rubbing, or blade loss.

In various embodiments of the subject claimed innovation, the three-pronged analysis (e.g., mode placement, vibration spectrum, real-time operation parameters, and so on) can be implemented in technological fields other than gas turbine engines in aircraft. In various embodiments, the three-pronged analysis described herein can be generalized for application in any technological environment where vibration analysis and vibration defect detection, prediction, and/or characterization is beneficial.

In various embodiments of the subject claimed innovation, a rub indicator (e.g., scalar, vector, matrix, and so on corresponding to a likelihood, type, severity, and/or location of and engine rub) can be generated as a function of real-time data collected from the engine (e.g., real-time operation parameters, real-time fundamental mode placements, real-time FFT vibration spectrums, and so on). Trained machine learning pattern recognition algorithms can search for anomalous patterns/signatures in the real-time data that are correlated with known/confirmed likelihoods, types, severities, and/or locations of rubs. The rub indicator can be considered as a diagnostic component to predict the health of the engine by detecting, predicting, and/or characterizing likelihoods, types, severities, and/or locations within the engine of potential rubs. Such a rub indicator as a function of the real-time data can help in better fleet management, more efficient diagnosis of core wear, cracks, creep, durability, performance, and life estimation, and even in predicting cabin noise levels and overall design assessment and evaluation.

Figure 18:
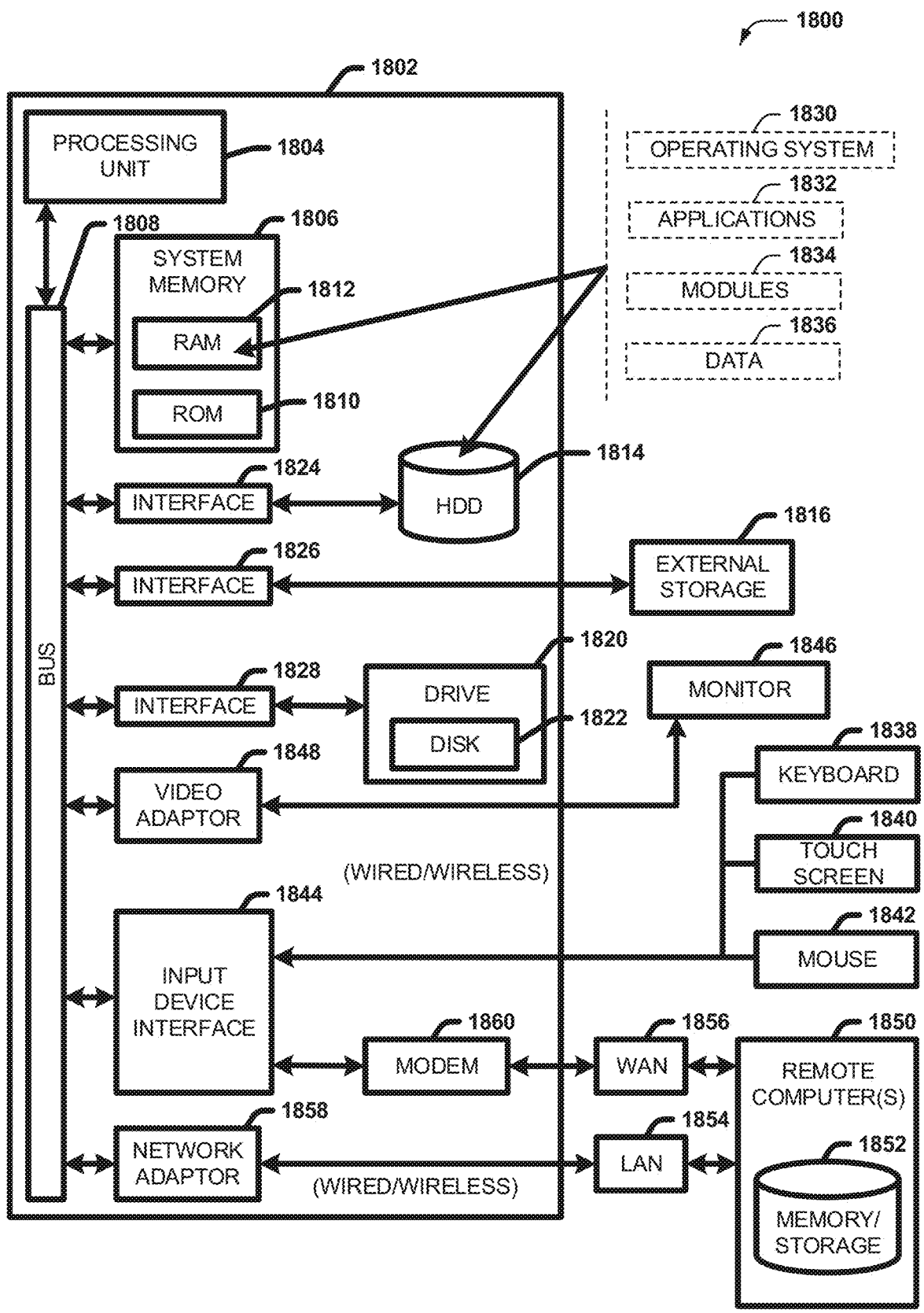
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enabled with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject claimed innovation are provided by the subject matter of the following clauses:

1. A system, comprising: a memory that stores computer-executable components; and a processor, operably coupled to the memory, that executes the computer-executable components stored in the memory, wherein the computer-executable components comprise: a sensor component that collects, from one or more sensors, real-time operation parameters of a gas turbine engine; an analysis component that statistically combines one or more first values, one or more second values, and one or more third values to yield a rub indicator for the gas turbine engine, wherein: the one or more first values are based on a first comparison of fundamental mode placements of the gas turbine engine, derived from the real-time operation parameters, and baseline fundamental mode placements; the one or more second values are based on a second comparison of a vibration spectrum of the gas turbine engine, derived from the real-time operation parameters, and a baseline vibration spectrum; and the one or more third values are based on a third comparison of the real-time operation parameters of the gas turbine engine and baseline operation parameters; and a classification component that generates a rub classification report indicating presence of rubbing between a rotor and a stator or between a rotor and another rotor of the gas turbine engine, based on the rub indicator.

2. The system of any preceding clause wherein the analysis component: generates the one or more first values via a first machine learning algorithm trained to recognize patterns in the first comparison indicative of no rubbing, light rubbing, heavy rubbing, or blade loss; generates the one or more second values via a second machine learning algorithm trained to recognize patterns in the second comparison indicative of no rubbing, light rubbing, heavy rubbing, or blade loss; and generates the one or more third values via a third machine learning algorithm trained to recognize patterns in the third comparison indicative of no rubbing, light rubbing, heavy rubbing, or blade loss.

3. The system of any preceding clause wherein the analysis component statistically combines the one or more first, second, and third values via a weighted average.

4. The system of any preceding clause wherein the computer-executable components further comprise: an inspection component that requests a borescope inspection based on the rub classification report.

5. The system of any preceding clause wherein the computer-executable components further comprise: an on-ground digital twin component that monitors performance of the gas turbine engine based on the rub classification report and recommends corrective action to the gas turbine engine based on the rub classification report.

6. The system of any preceding clause wherein the on-ground digital twin component tracks emerging trends in a fleet of gas turbine engines by monitoring other rub classification reports associated with the fleet and performs proactive work-scope identification for the fleet of gas turbine engines prior to scheduled maintenance, repair, and overhaul visits.

7. The system of any preceding clause wherein the real-time and baseline operation parameters include change in exhaust gas temperature versus change in core speed and discharge pressure versus vibration.

8. The system of any preceding clause wherein the baseline fundamental mode placements, the baseline vibration spectrum, and the baseline operation parameters correspond to proper performance of the gas turbine engine and are derived from development engines or fielded engine legacy data.

9. A computer-implemented method, comprising: collecting, by a device operatively coupled to a processor, real-time operation parameters of a gas turbine engine; statistically combining, by the device, one or more first values, one or more second values, and one or more third values to yield a rub indicator for the gas turbine engine, wherein: the one or more first values are based on a first comparison of fundamental mode placements of the gas turbine engine, derived from the real-time operation parameters, and baseline fundamental mode placements; the one or more second values are based on a second comparison of a vibration spectrum of the gas turbine engine, derived from the real-time operation parameters, and a baseline vibration spectrum; and the one or more third values are based on a third comparison of the real-time operation parameters of the gas turbine engine and baseline operation parameters; and generating, by the device, a rub classification report indicating presence of rubbing between a rotor and a stator or between a rotor and another rotor of the gas turbine engine based on the rub indicator.

10. The computer-implemented method of any preceding clause further comprising: generating, by the device, the one or more first values via a first machine learning algorithm trained to recognize patterns in the first comparison indicative of no rubbing, light rubbing, heavy rubbing, or blade loss; generating, by the device, the one or more second values via a second machine learning algorithm trained to recognize patterns in the second comparison indicative of no rubbing, light rubbing, heavy rubbing, or blade loss; and generating, by the device, the one or more third values via a third machine learning algorithm trained to recognize patterns in the third comparison indicative of no rubbing, light rubbing, heavy rubbing, or blade loss.

11. The computer-implemented method of any preceding clause wherein the statistically combining the one or more first, second, and third values employs a weighted average.

12. The computer-implemented method of any preceding clause further comprising: short listing, by the device, the gas turbine engine for a potential borescope inspection, based on the rub classification report.

13. The computer-implemented method of any preceding clause further comprising: monitoring, by the device, performance of the gas turbine engine based on the rub classification report; and recommending, by the device, corrective action to the gas turbine engine based on the rub classification report.

14. The computer-implemented method of any preceding clause further comprising: tracking, by the device, emerging trends in a fleet of gas turbine engines by monitoring other rub classification reports associated with the fleet; and performing, by the device, proactive work-scope identification for the fleet of gas turbine engines prior to scheduled maintenance, repair, and overhaul visits.

15. The computer-implemented method of any preceding clause wherein the real-time and baseline operation parameters include change in exhaust gas temperature versus change in core speed and discharge pressure versus vibration.

16. The computer-implemented method of any preceding clause wherein the baseline fundamental mode placements, the baseline vibration spectrum, and the baseline operation parameters correspond to proper performance of the gas turbine engine and are derived from development engines or fielded engine legacy data.

17. A computer program product for facilitating core rub diagnosis, the computer program product comprising a computer readable memory having program instructions embodied therewith, the program instructions executable by a processing component to cause the processing component to: collect, from one or more sensors, real-time operation parameters of a gas turbine engine; statistically combine one or more first values, one or more second values, and one or more third values to yield a rub indicator for the gas turbine engine, wherein: the one or more first values are based on a first comparison of fundamental mode placements of the gas turbine engine, derived from the real-time operation parameters, and baseline fundamental mode placements; the one or more second values are based on a second comparison of a vibration spectrum of the gas turbine engine, derived from the real-time operation parameters, and a baseline vibration spectrum; and the one or more third values are based on a third comparison of the real-time operation parameters of the gas turbine engine and baseline operation parameters; and generate a rub classification report that indicates presence of rubbing between a rotor and a stator or between a rotor and another rotor of the gas turbine engine, based on the rub indicator.

18. The computer program product of any preceding clause wherein the program instructions are further executable to cause the processing component to: generate the one or more first values via a first machine learning algorithm trained to recognize patterns in the first comparison indicative of no rubbing, light rubbing, heavy rubbing, or blade loss; generate the one or more second values via a second machine learning algorithm trained to recognize patterns in the second comparison indicative of no rubbing, light rubbing, heavy rubbing, or blade loss; and generate the one or more third values via a third machine learning algorithm trained to recognize patterns in the third comparison indicative of no rubbing, light rubbing, heavy rubbing, or blade loss.

19. The computer program product of any preceding clause wherein the program instructions are further executable to cause the processing component to: monitor performance of the gas turbine engine based on the rub classification report; and recommend corrective action to the gas turbine engine based on the rub classification report.

20. The computer program product of any preceding clause wherein the program instructions are further executable to cause the processing component to: track emerging trends in a fleet of gas turbine engines by monitoring other rub classification reports associated with the fleet; and perform proactive work-scope identification for the fleet of gas turbine engines prior to scheduled maintenance, repair, and overhaul visits.

What is claimed is:

1. A system, comprising:
a processor; and
a memory having computer-executable instructions stored, which, when executed by the processor, cause the processor to perform operations comprising:
    detecting real-time operation parameters of a gas turbine engine to produce fielded engine data;
    determining one or more first values via first operations, the first operations comprising:
        receiving baseline fundamental mode placements;
        determining operational fundamental mode placements of the gas turbine engine based on the fielded engine data; and
        comparing the baseline fundamental mode placements to the operational fundamental mode placements to generate the one or more first values;
    determining one or more second values via second operations, the second operations comprising:
        receiving a baseline vibration spectrum;
        determining an operational vibration spectrum of the gas turbine engine based on the fielded engine data; and
        comparing the baseline vibration spectrum to the operational vibration spectrum to generate the one or more second values;
    determining one or more third values via third operations, the third operations comprising:
        receiving baseline operation parameters;
        determining real-time operational parameters of the gas turbine engine based on the fielded engine data; and
        comparing the baseline operation parameters to the real-time operation parameters to generate the one or more third values;
    statistically combining, with a weighted average, the one or more first values, the one or more second values, and the one or more third values to generate a rub indicator for the gas turbine engine;
    determining presence of rub or predicting presence of rub between two components by comparing a rub limit to one or more of a magnitude of the rub indicator, a slope of the rub indicator, a variability of the rub indicator;
    indicating the presence of rub or the predicting presence of rub between the two components of the gas turbine engine with a rub classification report; and
    identifying the two components that are experiencing rub or about to experience the predicted rub, wherein the two components are i) a rotor and a stator or ii) a rotor and another rotor.

2. The system of claim 1, wherein the operations further comprise characterizing the rub as light, heavy, severe, axial, radial, or any combination thereof.

3. The system of claim 1, wherein:
determining the one or more first values comprises generating the one or more first values via a first machine learning algorithm trained to recognize patterns in the comparing of the baseline fundamental mode placements to the operational fundamental mode placements indicative of no rubbing, light rubbing, heavy rubbing, or blade loss;
determining the one or more second values comprises generating the one or more second values via a second machine learning algorithm trained to recognize patterns in the comparing of the baseline vibration spectrum to the operational vibration spectrum indicative of no rubbing, light rubbing, heavy rubbing, or blade loss; and
determining the one or more third values comprises generating the one or more third values via a third machine learning algorithm trained to recognize patterns in the comparing of the baseline operation parameters to the real-time operation parameters indicative of no rubbing, light rubbing, heavy rubbing, or blade loss.

4. The system of claim 1, wherein the operations further comprises:
automatically requesting a borescope inspection based on the rub classification report.

5. The system of claim 1, further comprising:
an on-ground digital twin component that monitors performance of the gas turbine engine based on the rub classification report and recommends corrective action to the gas turbine engine based on the rub classification report.

6. The system of claim 5, wherein the on-ground digital twin component tracks emerging trends in a fleet of gas turbine engines by monitoring other rub classification reports associated with the fleet and performs proactive work-scope identification for the fleet of gas turbine engines prior to scheduled maintenance, repair, and overhaul visits.

7. The system of claim 1, wherein the real-time operation parameters and the baseline operation parameters include change in exhaust gas temperature versus change in core speed and discharge pressure versus vibration.

8. The system of claim 1, wherein the baseline fundamental mode placements, the baseline vibration spectrum, and the baseline operation parameters correspond to proper performance of the gas turbine engine and are derived from development engines or fielded engine legacy data.

9. The system of claim 1, further comprising the gas turbine engine comprising the rotor and the stator or the rotor and the another rotor.

10. The system of claim 1, further comprising a plurality of sensors configured to detect the real-time operation parameters to produce the fielded engine data, the plurality of sensors including at least a vibration sensor and an accelerometer.

11. The system of claim 1, wherein the operations further comprise:
monitoring performance of the gas turbine engine based on the rub classification report; and
recommending corrective action to the gas turbine engine based on the rub classification report.

12. The system of claim 1, wherein the operations further comprise:
tracking emerging trends in a fleet of gas turbine engines by monitoring other rub classification reports associated with the fleet; and
performing proactive work-scope identification for the fleet of gas turbine engines prior to scheduled maintenance, repair, and overhaul visits.

13. A computer-implemented method, comprising:
detecting, with a device operatively coupled to a processor, real-time operation parameters of a gas turbine engine to produce fielded engine data;
determining, with the device, one or more first values via first operations, the first operations comprising:
receiving baseline fundamental mode placements;
determining operational fundamental mode placements of the gas turbine engine based on the fielded engine data; and
comparing the baseline fundamental mode placements to the operational fundamental mode placements to generate the one or more first values;
determining, with the device, one or more second values via second operations, the second operations comprising:
receiving a baseline vibration spectrum;
determining an operational vibration spectrum of the gas turbine engine based on the fielded engine data; and
comparing the baseline vibration spectrum to the operational vibration spectrum to generate the one or more second values;
determining, with the device, one or more third values via third operations, the third operations comprising:
receiving baseline operation parameters;
determining real-time operational parameters of the gas turbine engine based on the fielded engine data; and
comparing the baseline operation parameters to the real-time operation parameters to generate the one or more third values;
statistically combining, with a weighted average, by the device, the one or more first values, the one or more second values, and the one or more third values to generate a rub indicator for the gas turbine engine;
determining, with the device, presence of rub or predicting presence of rub between two components by comparing a rub limit to one or more of a magnitude of the rub indicator, a slope of the rub indicator, a variability of the rub indicator;
indicating, with the device, the presence of rub or the predicting presence of rub between the two components of the gas turbine engine with a rub classification report; and
identifying, with the device, the two components that are experiencing rub or about to experience the predicted rub, wherein the two components are i) a rotor and a stator or ii) a rotor and another rotor.

14. The computer-implemented method of claim 13, further comprising characterizing the rub as light, heavy, severe, axial, radial, or any combination thereof.

15. The computer-implemented method of claim 13, further comprising:
generating, by the device, the one or more first values via a first machine learning algorithm trained to recognize patterns in the comparing of the baseline fundamental mode placements to the operational fundamental mode placements indicative of no rubbing, light rubbing, heavy rubbing, or blade loss;
generating, by the device, the one or more second values via a second machine learning algorithm trained to recognize patterns in the comparing of the baseline vibration spectrum to the operational vibration spectrum indicative of no rubbing, light rubbing, heavy rubbing, or blade loss; and
generating, by the device, the one or more third values via a third machine learning algorithm trained to recognize patterns in the comparing of the baseline operation parameters to the real-time operation parameters indicative of no rubbing, light rubbing, heavy rubbing, or blade loss.

16. The computer-implemented method of claim 13, further comprising:
short listing, by the device, the gas turbine engine for a potential borescope inspection, based on the rub classification report.

17. The computer-implemented method of claim 13, further comprising:
monitoring, by the device, performance of the gas turbine engine based on the rub classification report; and
recommending, by the device, corrective action to the gas turbine engine based on the rub classification report.

18. The computer-implemented method of claim 13, further comprising:
tracking, by the device, emerging trends in a fleet of gas turbine engines by monitoring other rub classification reports associated with the fleet; and
performing, by the device, proactive work-scope identification for the fleet of gas turbine engines prior to scheduled maintenance, repair, and overhaul visits.

19. The computer-implemented method of claim 13, wherein:
the real-time operation parameters and the baseline operation parameters include change in exhaust gas temperature versus change in core speed and discharge pressure versus vibration.

20. The computer-implemented method of claim 13, wherein the baseline fundamental mode placements, the baseline vibration spectrum, and the baseline operation parameters correspond to proper performance of the gas turbine engine and are derived from development engines or fielded engine legacy data.

* * * * *